United States Patent
Jiang et al.

(10) Patent No.: US 12,153,716 B2
(45) Date of Patent: Nov. 26, 2024

(54) APPLICATION PROCESSING METHOD AND APPARATUS, CLOUD ENVIRONMENT, MEDIUM, AND PROGRAM PRODUCT

(71) Applicant: HUAWEI TECHNOLOGIES CO., LTD., Guangdong (CN)

(72) Inventors: Jianyu Jiang, Hong Kong (CN); Xusheng Chen, Hong Kong (CN); Tsz On Li, Hong Kong (CN); Cheng Wang, Hong Kong (CN); Heming Cui, Hong Kong (CN); Sen Wang, Hong Kong (CN); Peng Wang, Shenzhen (CN); Gong Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 239 days.

(21) Appl. No.: 17/975,163

(22) Filed: Oct. 27, 2022

(65) Prior Publication Data
US 2023/0106435 A1    Apr. 6, 2023

Related U.S. Application Data

(63) Continuation of application No. PCT/CN2021/090317, filed on Apr. 27, 2021.

(30) Foreign Application Priority Data

Apr. 30, 2020    (CN) .......................... 202010366539.4

(51) Int. Cl.
G06F 21/62    (2013.01)
G06F 21/53    (2013.01)

(52) U.S. Cl.
CPC ............ G06F 21/629 (2013.01); G06F 21/53 (2013.01); *G06F 2221/033* (2013.01)

(58) Field of Classification Search
CPC ................................................... G06F 21/629
See application file for complete search history.

(56) References Cited

U.S. PATENT DOCUMENTS

| 2013/0159726 A1* | 6/2013 | McKeen | ................. G06F 21/53 713/189 |
| 2016/0246720 A1* | 8/2016 | Pandey | ................... G06F 13/24 |

(Continued)

FOREIGN PATENT DOCUMENTS

| CN | 107431621 A | 12/2017 |
| CN | 109032663 A | 12/2018 |
| CN | 110874468 A | 3/2020 |

OTHER PUBLICATIONS

International Search Report and Written Opinion in International Appln. No. PCT/CN2021/090317, mailed on Jul. 29, 2021, 18 pages (with English translation).

*Primary Examiner* — Bradley W Holder
(74) *Attorney, Agent, or Firm* — Fish & Richardson P.C.

(57) ABSTRACT

Embodiments of this application provide application processing methods and apparatuses. One method includes: receiving a startup request from a first client device, where the startup request is used to start an application. Loading, in a high-level language execution environment of an enclave, a manifest file of the application and a dependency relationship between an enclave entrypoint function of the application and a static dependency class, and loading a static dependency class of the enclave entrypoint function of the application based on the manifest file and the dependency relationship between the enclave entrypoint function and the static dependency class.

20 Claims, 9 Drawing Sheets

(56) References Cited

U.S. PATENT DOCUMENTS

2018/0096137 A1* 4/2018 Trostle .................. G06F 21/53
2019/0087586 A1* 3/2019 McKeen ................ G06F 21/53

* cited by examiner

APPLICATION PROCESSING METHOD AND APPARATUS, CLOUD ENVIRONMENT, MEDIUM, AND PROGRAM PRODUCT

CROSS-REFERENCE TO RELATED APPLICATIONS

This application is a continuation of International Application No. PCT/CN2021/090317, filed on Apr. 27, 2021, which claims priority to Chinese Patent Application No. 202010366539.4, filed on Apr. 30, 2020. The disclosures of the aforementioned applications are hereby incorporated by reference in their entirety.

TECHNICAL FIELD

Embodiments of this application relate to communications technologies, and in particular, to an application processing method and apparatus, a cloud environment, a medium, and a program product.

BACKGROUND

Cloud computing (cloud computing) is a type of distributed computing. Efficient data processing applications (such as Spark applications) may be remotely deployed in a cloud environment by using a cloud computing technology, so that a user may remotely use these data processing applications through cloud services. The cloud computing technology makes it possible for efficient data processing applications to be widely deployed. Applications deployed in a cloud environment usually need high stability and security. For example, these applications cannot easily crash when processing a large quantity of requests, and do not disclose user privacy data when being attacked by an external attacker. Because a computer programming language Java is simple, object-oriented, distributed, robust, secure, platform-independent, portable, multithreading, and dynamic, a plurality of applications deployed in the cloud environment are written in the Java language.

Applications deployed in the cloud environment may encounter privileged attacks (privileged attacks). The Java language cannot prevent the privilege attacks in the cloud environment. Therefore, to prevent the privilege attacks in the cloud environment, a trusted execution environment (trusted execution environment, TEE) that runs in isolation from an untrusted execution environment has become an important tool for protecting applications in recent years. Intel's software guard extensions (software guard extensions, SGX) is the most popular trusted execution environment products. The SGX provides abstraction (abstraction) executed by an enclave (enclave). Applications and data running in the enclave are stored in a memory area that is isolated from a common execution environment, so that privileged attackers that can control an operating system and a basic input/output system (basic input output system. BIOS) cannot extract or tamper with data of the operating system and the basic input/output system.

Currently, an execution environment provided by the enclave is an execution environment of a C/C++ language. Because a memory area of the enclave is limited, an application developer needs to manually divide original program code of an application into a trusted part and an untrusted part, and manually rewrite code of the trusted part from the Java language into the C/C++ language, to run the trusted part of the application in the enclave, so that it may be ensured that the application has a small trusted computing base (trusted computing base, TCB) and a small attack surface (attack surface). However, a manner of manually rewriting code causes a huge workload of code rewriting, and code rewriting efficiency is low.

Therefore, an urgent problem needs to be resolved is how to run the trusted part of the application in the enclave while the small TCB and the small attack surface are maintained and the workload of manually rewriting code is reduced.

SUMMARY

Embodiments of this application provide an application processing method and apparatus, a cloud environment, a medium, and a program product, to resolve a problem of how to run a trusted part of an application in an enclave while a small TCB and a small attack surface are maintained and a workload of manually rewriting code is reduced.

According to a first aspect, an embodiment of this application provides an application processing method, and the method includes: first, receiving a startup request sent by a first client, where the startup request is used to start an application; second loading, based on the startup request, in a high-level language execution environment of an enclave, a manifest file of the application and a dependency relationship between an enclave entrypoint function of the application and a static dependency class, where the manifest file includes description information of the enclave entrypoint function of the application and/or description information of an enclave exit function of the application; and then loading, a static dependency class of the enclave entrypoint function of the application based on the manifest file and the dependency relationship between the enclave entrypoint function and the static dependency class.

According to the method, in the high-level language execution environment running in the enclave, code of a trusted part of the application may be loaded based on the manifest file of the application and the dependency relationship between the enclave entrypoint function of the application and the static dependency class. Therefore, a part of code (that is, the enclave entrypoint function and the static dependency class) that is of the application and that is written in a high-level language is directly run in the enclave, so that security of the trusted part of the application can be improved, the application can maintain a small TCB and a small attack surface, execution efficiency of the application can be improved in the enclave, a workload of manually rewriting code of the application can be reduced, and usability of running the application in the enclave can be improved.

In a possible implementation, before the dependency relationship between the enclave entrypoint function of the application and the static dependency class is loaded, the dependency relationship between the enclave entrypoint function of the application and the static dependency class may be obtained in the following several manners. In a first manner, based on code of the application, a description file including a class annotated by a first annotation in the application is obtained. The first annotation is used to represent that a class annotated by the first annotation is an enclave entrypoint function. The dependency relationship between the enclave entrypoint function of the application and the static dependency class is obtained based on the description file including the class annotated by the first annotation in the application. In a second manner, the dependency relationship that is between the enclave entrypoint function of the application and the static dependency class and that is sent by the first client is received. In a third manner, the dependency relationship between the enclave entrypoint function of the application and the static dependency class is obtained from a storage database. In this possible implementation, flexibility of obtaining the dependency relationship between the enclave entrypoint function of the application and the static dependency class can be improved.

As a possible implementation, before the manifest file of the application is loaded, the following manner may be used to obtain the manifest file of the application: The manifest file of the application sent by the first client is received. Alternatively, the manifest file of the application is obtained from the storage database. In this possible implementation, flexibility of obtaining the manifest file of the application can be improved.

In a possible implementation, the high-level language execution environment may be run in the enclave in advance, or before the loading a manifest file of the application and a dependency relationship between an enclave entrypoint function of the application and a static dependency class, the method may further include: loading the high-level language execution environment in the enclave, to verify integrity of the high-level language execution environment. In this possible implementation, a manner of running the high-level language execution environment in the enclave and an implementation of running the application in the enclave are extended.

In a possible implementation, after the loading a static dependency class of the enclave entrypoint function of the application, the method may further include: verifying integrity of the loaded static dependency class of the enclave entrypoint function; and after integrity verification of the static dependency class of the enclave entrypoint function succeeds, generating a hash value of the application based on a hash value of the static dependency class of the enclave entrypoint function and the manifest file. The hash value of the application is sent to the first client, where the hash value of the application is used by the first client to verify the integrity of the loaded static dependency class of the enclave entrypoint function in the enclave. In this possible implementation, a computing device and a client may separately verify the integrity of the static dependency class of the enclave entrypoint function loaded in the enclave.

It should be understood that an operation of verifying the integrity may be performed at any moment after the enclave entrypoint function of the application and the static dependency class of the enclave entrypoint function are loaded and before the enclave entrypoint function of the application is run. This is not limited herein.

In a possible implementation, the method may further include; after integrity verification of the static dependency class of the enclave entrypoint function succeeds, when a first enclave entrypoint function of the application is invoked by using a first thread, switching to a first memory area allocated to the first thread in the enclave; and creating and executing an object of a static dependency class of the first enclave entrypoint function in the first memory area. In this possible implementation, memory may be allocated to the application running in the enclave, in a thread-independent memory management manner without participation of an operating system, so that a developer of the application can be prevented from manually managing memory, and memory management efficiency can be improved.

In a possible implementation, if the first enclave entrypoint function further includes a first dynamic dependency class, the method further includes: obtaining a dependency relationship between the first dynamic dependency class and the static dependency class; dynamically loading the first dynamic dependency class based on the dependency relationship between the first dynamic dependency class and the static dependency class; verifying integrity of the first dynamic dependency class; and after integrity verification of the first dynamic dependency class succeeds, creating and executing an object of the first dynamic dependency class in the first memory area. In this possible implementation, when the enclave entrypoint function of the application is run in the enclave, a required class function may be dynamically loaded.

In a possible implementation, the first enclave entrypoint function and a first enclave exit function have an invoking relationship, and the method further includes: switching from the high-level language execution environment of the enclave to a non-enclave environment; executing the first enclave exit function in the non-enclave environment; and returning to the high-level language execution environment of the enclave. In this possible implementation, when the enclave entrypoint function of the application is run in the enclave, the enclave exit function invoked by the enclave entrypoint function may be executed.

In a possible implementation, the method further includes: after the first enclave entrypoint function exits execution, if no object of the first enclave entrypoint function is accessed by another thread, clearing a mapping relationship between the first thread and the first memory area. In this possible implementation, after the first enclave entrypoint function is executed, the first memory area allocated to the first thread may be cleared promptly, so that a memory page included in the first memory area may be allocated to another thread for use. Therefore, an enclave memory can be released promptly, and garbage collection efficiency in the enclave memory can be improved.

In a possible implementation, the method further includes: after the first enclave entrypoint function exits execution, if a first object of the first enclave entrypoint function is accessed by another thread, synchronously stopping execution of enclave entrypoint functions invoked by all threads in the enclave; determining at least one second thread that accesses the first object; performing copying processing on the first object based on a quantity of the at least one second thread; and clearing the mapping relationship between the first thread and the first memory area. For example, the performing copying processing on the first object based on a quantity of the at least one second thread may include: if a quantity of second threads is 1, copying the first object to a second memory area corresponding to the second thread; or if a quantity of second threads is greater than 1, copying the first object to a global memory area of the enclave. In this possible implementation, after the first enclave entrypoint function is executed, the first memory area allocated to the first thread may be cleared promptly, so that the memory page included in the first memory area may be allocated to another thread for use. Therefore, the enclave memory can be released promptly, and the garbage collection efficiency in the enclave memory can be improved.

According to a second aspect, an embodiment of this application provides an application processing method, where the method includes: first, obtaining, based on code of an application, a class annotated by a first annotation and/or a class annotated by a second annotation in the application, where the first annotation is used to represent that a class annotated by the first annotation is an enclave entrypoint function, and the second annotation is used to represent that a class annotated by the second annotation is an enclave exit function; and then generating, a manifest file of the application based on the class annotated by the first annotation and/or the class annotated by the second annotation, where the manifest file includes description information of the enclave entrypoint function of the application and/or description information of an enclave exit function of the application.

By using the method, any device that can obtain the code of the application (for example, a device of a developer of the application, or a client that uses the application) may generate the manifest file of the application based on the class annotated by the first annotation and/or the class annotated by the second annotation.

In a possible implementation, the method may further include: obtaining a static dependency class of the enclave entrypoint function of the application based on the description file including the class annotated by the first annotation; and generating a hash value of the application based on a hash value of the static dependency class of the enclave entrypoint function and the manifest file, where the hash value of the application is used to verify integrity of the static dependency class. In this possible implementation, the hash value of the application may be obtained. Subsequently, when a user remotely uses the application, integrity of the code running in the enclave of a cloud environment may be verified based on the hash value and a hash value returned by the cloud environment.

In a possible implementation, the method may further include: obtaining the dependency relationship between the enclave entrypoint function of the application and the static dependency class based on a description file including the class annotated by the first annotation.

According to a third aspect, an embodiment of this application provides an application processing apparatus, where the apparatus includes a receiving module and a processing module. The receiving module is configured to receive a startup request sent by a first client, where the startup request is used to start an application. The processing module is configured to: load, based on the startup request, in a high-level language execution environment of an enclave, a manifest file of the application and a dependency relationship between an enclave entrypoint function of the application and a static dependency class; and load a static dependency class of the enclave entrypoint function of the application, based on the manifest file and the dependency relationship between the enclave entrypoint function and the static dependency class. The manifest file includes description information of the enclave entrypoint function of the application and/or description information of an enclave exit function of the application.

In a possible implementation, the processing module is further configured to: before the dependency relationship between the enclave entrypoint function of the application and the static dependency class is loaded, based on code of the application, obtain a description file including a class annotated by a first annotation in the application; and obtain the dependency relationship between the enclave entrypoint function of the application and the static dependency class based on the description file including the class annotated by the first annotation in the application, where the first annotation is used to represent that the class annotated by the first annotation is an enclave entrypoint function.

In a possible implementation, the processing module is further configured to: before the dependency relationship between the enclave entrypoint function of the application and the static dependency class is loaded, receive, by using the receiving module, the dependency relationship that is between the enclave entrypoint function of the application and the static dependency class and that is sent by the first client. Alternatively, the processing module is further configured to: before the dependency relationship between the enclave entrypoint function of the application and the static dependency class is loaded, obtain the dependency relationship between the enclave entrypoint function of the application and the static dependency class from a storage database.

In a possible implementation, the processing module is further configured to: before the manifest file of the application is loaded, receive the manifest file of the application by using the receiving module, where the manifest file is sent by the first client. Alternatively, the processing module is further configured to: before the manifest file of the application is loaded, obtain the manifest file of the application from the storage database.

In a possible implementation, the processing module is further configured to: before the manifest file of the application and the dependency relationship between the enclave entrypoint function of the application and the static dependency class are loaded, load a high-level language execution environment in the enclave, to verify integrity of the high-level language execution environment.

In a possible implementation, the apparatus may further include a sending module. The processing module is further configured to: after the static dependency class of the enclave entrypoint function of the application is loaded, verify integrity of the loaded static dependency class of the enclave entrypoint function; and after integrity verification of the static dependency class of the enclave entrypoint function succeeds, generate a hash value of the application based on a hash value of the static dependency class of the enclave entrypoint function and the manifest file. The sending module is configured to send the hash value of the application to the first client, where the hash value of the application is used by the first client to verify integrity of the loaded static dependency class of the enclave entrypoint function in the enclave.

In a possible implementation, the processing module is further configured to: after the integrity verification of the static dependency class of the enclave entrypoint function succeeds, when a first enclave entry point function of the application is invoked by using a first thread, switch to a first memory area allocated to the first thread in the enclave; and create and execute an object of a static dependency class of the first enclave entrypoint function in the first memory area.

In a possible implementation, the first enclave entrypoint function further includes a first dynamic dependency class. The processing module is further configured to: obtain a dependency relationship between the first dynamic dependency class and the static dependency class; dynamically load the first dynamic dependency class based on the dependency relationship between the first dynamic dependency class and the static dependency class; verify integrity of the first dynamic dependency class; and after integrity verification of the first dynamic dependency class succeeds, create and execute an object of the first dynamic dependency class in the first memory area.

In a possible implementation, the first enclave entrypoint function and the first enclave exit function have an invoking relationship. The processing module is further configured to: switch from the high-level language execution environment of the enclave to a non-enclave environment; execute the first enclave exit function in the non-enclave environment; and return to the high-level language execution environment of the enclave.

In a possible implementation, the processing module is further configured to: after the first enclave entrypoint function exits execution, if no object of the first enclave entrypoint function is accessed by another thread, clear a mapping relationship between the first thread and the first memory area.

In a possible implementation, the processing module is further configured to: after the first enclave entrypoint function exits execution, if a first object of the first enclave entrypoint function is accessed by another thread, synchronously stop execution of enclave entrypoint functions invoked by all threads in the enclave; determine at least one second thread that accesses the first object; perform copying processing on the first object based on a quantity of the at least one second thread; and clear the mapping relationship between the first thread and the first memory area. For example, the processing module is specifically configured to: when a quantity of second threads is 1, copy the first object to a second memory area corresponding to the second thread; or when a quantity of second threads is greater than 1, copy the first object to a global memory area of the enclave.

For beneficial effects of the apparatus for processing an application provided in the third aspect and the possible implementations of the third aspect, refer to beneficial effects brought by the first aspect and the possible implementations of the first aspect. Details are not described herein again.

According to a fourth aspect, an embodiment of this application provides an application processing apparatus, where the apparatus includes a processing module. The processing module is configured to obtain, based on code of an application, a class annotated by a first annotation and/or a class annotated by a second annotation in the application; and generate a manifest file of the application based on the class annotated by the first annotation and/or the class annotated by the second annotation, where the first annotation is used to represent that the class annotated by the first annotation is an enclave entrypoint function, the second annotation is used to represent that the class annotated by the second annotation is an enclave exit function, and the manifest file includes: description information of an enclave entrypoint function of the application and/or description information of an enclave exit function of the application.

In a possible implementation, the processing module is further configured to: obtain a static dependency class of the enclave entrypoint function of the application based on a description file including the class annotated by the first annotation; and generate a hash value of the application based on a hash value of the static dependency class of the enclave entrypoint function and the manifest file, where the hash value of the application is used to verify integrity of the static dependency class.

In a possible implementation, the processing module is further configured to obtain the dependency relationship between the enclave entrypoint function of the application and the static dependency class based on the description file including the class annotated by the first annotation.

For beneficial effects of the apparatus for processing an application provided in the fourth aspect and the possible implementations of the fourth aspect, refer to beneficial effects brought by the second aspect and the possible implementations of the second aspect. Details are not described herein again.

According to a fifth aspect, an embodiment of this application provides an application processing apparatus, where the application processing apparatus includes a processor and a memory. The memory is configured to store computer-executable program code, where the program code includes computer-executable instructions; and when the processor executes the computer-executable instructions, the computer-executable instructions enable the application processing apparatus to perform the method provided in the first aspect or the possible implementations of the first aspect.

According to a sixth aspect, an embodiment of this application provides an application processing apparatus, where the application processing apparatus includes a processor and a memory. The memory is configured to store computer-executable program code, where the program code includes computer-executable instructions; and when the processor executes the computer-executable instructions, the computer-executable instructions enable the application processing apparatus to perform the method provided in the second aspect or the possible implementations of the second aspect.

According to a seventh aspect, an embodiment of this application provides an application processing apparatus, including a unit, a module, or a circuit configured to perform the method provided in the first aspect or the possible implementations of the first aspect. The application processing apparatus may be a computing device in a cloud environment, or may be a module of a computing device applied to a cloud environment, for example, a chip of the computing device applied to the cloud environment.

According to an eighth aspect, an embodiment of this application provides an application processing apparatus, including a unit, a module, or a circuit configured to perform the method provided in the second aspect or the possible implementations of the second aspect. The application processing apparatus may be a client in a cloud environment, or may be a module of a client applied to a cloud environment, for example, a chip of the client applied to the cloud environment.

According to a ninth aspect, an embodiment of this application provides a network apparatus. The network apparatus stores a computer program, and when the computer program is executed by the network apparatus, the method provided in the first aspect or the possible implementations of the first aspect is implemented, or the method provided in the second aspect or the possible implementations of the second aspect is implemented. For example, the network apparatus may be a chip.

According to a tenth aspect, an embodiment of this application provides a network apparatus, and the network apparatus includes a processor and an interface circuit. The interface circuit is configured to receive computer-executable instructions and transmit the computer-executable instructions to the processor, and the processor runs the computer-executable instructions to perform the method provided in the first aspect or the possible implementations of the first aspect, or to perform the method provided in the second aspect or the possible implementations of the second aspect. For example, the network apparatus may be a chip.

According to an eleventh aspect, an embodiment of this application provides a network apparatus, and the network apparatus includes a processor and a memory. The memory is configured to store computer-executable instructions, and the processor is configured to execute the computer-executable instructions stored in the memory, the network apparatus is enabled to perform the method provided in the first aspect or the possible implementations of the first aspect, or the method provided in the second aspect or the possible implementations of the second aspect. For example, the network apparatus may be a chip.

According to a twelfth aspect, an embodiment of this application provides a network apparatus, and the network apparatus includes a processor, a memory, and a transceiver. The transceiver is configured to receive a signal or send a signal; the memory is configured to store a computer program; and the processor is configured to invoke the computer program from the memory to perform the method provided in the first aspect or the possible implementations of the first aspect, or to perform the method provided in the second aspect or the possible implementations of the second aspect. For example, the network apparatus may be a chip.

According to a thirteenth aspect, an embodiment of this application provides a computer program product, where the computer program product includes computer program code, and when the computer program code is run on a computer, the computer is enabled to perform the method provided in the first aspect or the possible implementations of the first aspect, or to perform the method provided in the second aspect or the possible implementations of the second aspect.

According to a fourteenth aspect, an embodiment of this application provides a computer-readable storage medium, where the computer-readable storage medium is configured to store a computer program or computer-executable instructions, and when the computer program or the computer-executable instructions is/are run on a computer, the computer is enabled to perform the method provided in the first aspect or the possible implementations of the first aspect, or to perform the method provided in the second aspect or the possible implementations of the second aspect.

According to a fifteenth aspect, an embodiment of this application provides a cloud environment, where the cloud environment includes the application processing apparatus according to any one of the third aspect and the application processing apparatus according to any one of the fourth aspect. The cloud environment includes: the application processing apparatus according to any one of the fifth aspect and the application processing apparatus according to any one of the sixth aspect.

According to the application processing method and apparatus, the cloud environment, the medium, and the program product that are provided in embodiments of this application, in the high-level language execution environment running in the enclave, the code of the trusted part of the application may be loaded based on the manifest file of the application and the dependency relationship between the enclave entrypoint function of the application and the static dependency class. Therefore, a part of code (that is, the enclave entrypoint function and the static dependency class) that is of the application and that is written in a high-level language is directly run in the enclave, so that security of the trusted part of the application can be improved, the application can maintain a small TCB and a small attack surface, execution efficiency of the application can be improved in the enclave, a workload of manually rewriting code of the application can be reduced, and usability of running the application in the enclave can be improved.

DESCRIPTION OF EMBODIMENTS

Figure 1:
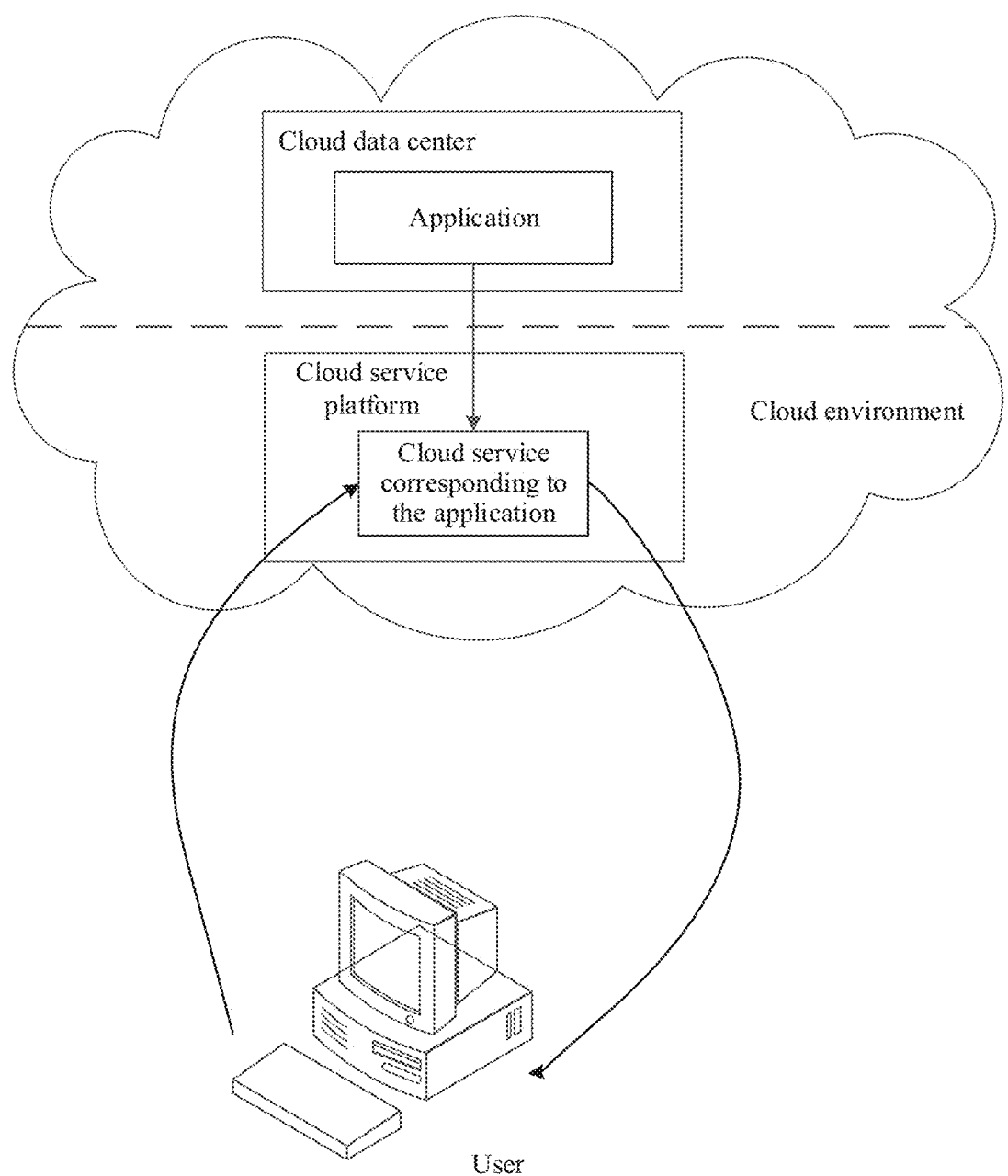
FIG. 1 is a schematic diagram of an application scenario according to an embodiment of this application.

FIG. 1 is a schematic diagram of an application scenario according to an embodiment of this application. As shown in FIG. 1, the application may be deployed in a cloud environment. The cloud environment is an entity that uses basic resources to provide cloud services for users in a cloud computing mode. The cloud environment includes a cloud data center and a cloud service platform. The cloud data center includes a large quantity of basic resources (including computing resources, storage resources, and network resources) owned by a cloud service provider. The computing resources included in the cloud data center may be a large quantity of computing devices (for example, servers). For example, the computing resources included in the cloud data center are a server on which a virtual machine runs. An application may be independently deployed on a server or a virtual machine (virtual machine, VM) in the cloud data center, the application may also be deployed on a plurality of servers in the cloud data center in a distributed manner, may be deployed on a plurality of virtual machines in the cloud data center in a distributed manner, or may be deployed on servers and virtual machines in the cloud data center in a distributed manner.

For example, the application may be abstracted by the cloud service provider as a cloud service on the cloud service platform and provided for the user. After the user purchases the cloud service on the cloud service platform (for example, the user may pre-recharge and then perform settlement based on a final resource usage status), the cloud environment provides the cloud service for the user by using the application deployed in the cloud data center. When using the application remotely, the user may specify an operation that needs to be executed by the application by using an application programming interface (application program interface, API) or a GUI, the application in the cloud environment executes a corresponding operation, and returns an execution result to the user by using the API or the GUI.

In some embodiments, the foregoing application deployed in a cloud environment may also be referred to as an application using a user-server model. In other words, the server on which the application runs is a server in the cloud environment.

Applications deployed in the cloud environment may encounter the following privileged attacks (privileged attacks): an external privileged attacker may control an operating system of the cloud environment through operating system vulnerabilities to attack applications running on the operating system. For example, data of an application running on the operating system is extracted and tampered with. Alternatively, an internal privileged attacker (for example, an employee of a cloud environment provider (a cloud provider for short)) may physically (physically) attack an application running in the cloud environment.

Currently, the Java language cannot prevent the privilege attacks in the cloud environment. Therefore, to avoid the privilege attacks in the cloud environment, a trusted execution environment that runs in isolation from an untrusted execution environment has become an important tool for protecting the cloud application in recent years. Intel SGX is currently the most popular trusted execution environment product. SGX provides abstraction (abstraction) executed by an enclave (enclave). The enclave has the following features.

1. The enclave may provide two security features: confidentiality (confidentially) and integrity (integrity).

Specifically, a memory area storing data and code in the enclave is isolated from a common untrusted memory area. Therefore, data and code running in the enclave cannot be snooped, extracted, or tampered with by privileged attackers. Therefore, the enclave may ensure confidentiality and integrity of an application running in the enclave.

2. The enclave may provide a remote verification (remote attestation) mechanism.

Specifically, the remote verification mechanism may measure (measure) integrity of an execution environment running in the enclave, and generate a verification report (for example, a hash value of the execution environment) and provide the verification report to a client that remotely uses the application, so that the client verifies the execution environment running in the enclave. The measure described herein may also be referred to as verification.

3. The enclave may provide two interfaces for applications, an enclave entrypoint function (ECall) and an enclave exit function (OCall).

Specifically, the enclave entrypoint function is a trusted function defined by an application and executed in the enclave. The enclave exit function is a function that is invoked when the enclave entrypoint function is executed in the enclave and that is executed in an untrusted execution environment. The enclave exit function is usually used to execute privileged instructions, for example, an operating system function (System Call). It should be understood that the enclave entrypoint function may have at least one enclave exit function having an invoking relationship, or may have no enclave exit function. Specifically, the enclave entrypoint function may be related to whether the enclave entrypoint function needs to execute the privileged instructions.

For example, when an enclave entrypoint function of an application is invoked by an untrusted environment, the enclave entrypoint function is executed in an execution environment of the enclave, to decrypt encrypted data provided by a user and perform calculation. In a computing process, if the enclave entrypoint function needs to invoke the enclave exit function, the enclave entrypoint function exits the enclave execution environment, and a corresponding enclave exit function is executed in the untrusted execution environment. After the execution is complete, the enclave entrypoint function returns to the execution environment of the enclave, and the enclave entrypoint function continues to be executed. Finally, after a result calculated by the enclave entrypoint function is encrypted, the enclave execution environment exits and the encrypted execution result is returned to the user.

4. The enclave may reduce a TCB and an attack surface.

Specifically, a conventional system trusts system software, an operating system, and a BIOS. Therefore, a TCB of the conventional system includes all the software and hardware, and interaction between the system software and an untrusted user becomes an attack surface. However, the enclave provided by the TEE trusts only code running in the enclave (namely, the TCB), and the attack surface is only an interaction part (such as an enclave exit function and an enclave entrypoint function) between the enclave and an untrusted environment. Therefore, the TCB and the attack surface may be reduced.

5. Enclave execution may reduce computational overheads and storage overheads.

Specifically, conventional trusted computing uses homomorphic encryption of trusted user data, so that a cloud environment may directly perform an operation on the encrypted data. These computational operations are usually limited to addition, multiplication, and exponentiation. In addition, the computing of homomorphic encryption/decryption takes long time. As a result, computational costs of the application are high (10× to 1000×). In addition, different homomorphic encryption algorithms are required to support different computing. This results in extra storage overheads (2× to 4×). The enclave may support all computational operations. Therefore, computational overheads and storage overheads can be reduced.

Currently, an execution environment provided by the enclave is an execution environment of a C/C++ language, that is, an enclave entrypoint function and an enclave exit function that are provided by the enclave are C/C++ interface functions. Therefore, in the current technology, the following manner is provided to enable an application to run in the enclave.

A developer of an application manually divides original program code of the application into a trusted part and an untrusted part. The trusted part processes decrypted sensitive data, the untrusted part manages encrypted data, and the operating system invokes and manages the enclave. Then, the developer of the application manually rewrites the code of the trusted part from the Java language to the C/C++ language, and adds encryption and decryption logic, so that the trusted part of the application may be run in the enclave. Invoking of the operating system is delivered to the untrusted environment for execution by using the enclave exit function written by the application developer, and a returned result is verified.

In the foregoing manners of manual division and manual rewriting, a part of code of an application may run in the enclave, to process and store sensitive data. In this way, the application may maintain a small TCB and a small attack surface. However, in the foregoing manner of rewriting the trusted part of code from the Java language to the C/C++ language, all trusted Java code and all Java library functions on which the trusted Java code depends need to be rewritten into C/C++ code, and all operating system functions need to be rewritten into enclave exit functions. However, a Java dependency library may include tens of thousands of lines of code. Therefore, the foregoing manner causes a huge workload of rewriting, and rewriting efficiency is low. As a result, usability of running an application in the enclave is poor.

In addition, because C/C++ does not have a capability of automatically managing a memory, when the trusted part of the application needs to be run in the enclave in the foregoing manner of rewriting code of the trusted part of the application from the Java language into the C/C++ language, a memory of the trusted part of the application needs to be manually managed and run.

In consideration of the foregoing problem of a huge workload of rewriting, another solutions provide to run the entire application in the enclave. For example, a plurality of systems (such as Graphene-SGX and SCONE) combine a library operating system (library OS) or a container (container) to run the entire application in the enclave. Specifically, a modified library operating system program or a container daemon (Container Daemon) runs in the enclave, and then the program measures, loads and runs a complete application or a container image (image) that does not need to be changed in the enclave. A hash value generated by a loading process will be used by the user to verify integrity of the application running in the enclave.

In the foregoing manner of running a complete application in the enclave, although there is no need to manually divide the trusted part and the untrusted part of the application, and there is no need to rewrite the trusted part of the application, a new problem arises when the application is run in the enclave, which is specifically as follows.

(1) A large TCB and a large attack surface are caused.

Specifically, a TCB of the application includes an application and a dependency library of the application, a library operating system (or a container daemon), trusted hardware, and the like. The library operating system (or the container daemon) may include hundreds of thousands of lines of code. Vulnerabilities in any code of the TCB may cause the application to crash or be attacked. Therefore, confidentiality and integrity of the application are damaged.

(2) Execution efficiency of the application in the enclave is low.

Specifically, the enclave execution generally provides a limited memory capacity, for example, a maximum memory capacity is about 100M. Currently, when the enclave is out of memory, page swapping (pagging) that is 1000× higher than memory execution is used to process data. To be specific, data is stored in an untrusted memory in a page swapping manner, and when the data is used, the data is read from the untrusted memory to the enclave.

When a complete unchanged application is run in the enclave in the foregoing manner, all data and code of the application need to be stored in a memory of the enclave regardless of whether sensitive data is processed. Therefore, running an application in the enclave in this manner may cause low execution efficiency of the application due to frequent page swapping. For example, a Java virtual machine occupies more than 100 MB memory after initialization is completed. Therefore, when a complete Java virtual machine is run in the foregoing manner, execution efficiency of the Java virtual machine may be low due to frequent page swapping.

Therefore, an urgent problem needs to be resolved is how to run a trusted part of an application in an enclave while a small TCB and a small attack surface are maintained and a workload of manually rewriting code is reduced.

As described above, currently, an execution environment provided by the enclave is an execution environment of a C/C++ language, that is, an enclave entrypoint function and an enclave exit function that are provided by the enclave are C/C++ interface functions. A low-level C/C++ interface function causes a security problem of the trusted part of the application. Specifically, the C/C++ language has a non-memory security feature. Therefore, a privileged attacker may attack the C/C++ language by using a vulnerability of the C/C++ language. The C/C++ language has a non-type security feature. This may affect confidentiality and integrity of an application. For example, a trusted part written in the C/C++ language may have a buffer overflow error. The error may pollute an execution stack of the application and affect an execution control flow of the application.

Therefore, in consideration of security, efficiency, and usability problems existing in the foregoing manner, with reference to features such as memory security and type security of an object-oriented high-level language (for example, the Java language), and a feature that most applications are currently written in the object-oriented high-level language, embodiments of this application provide an execution environment for a high-level language running in the enclave, and a method for a part of code of an application written in the high-level language to be directly run in the enclave. That is, an execution environment in which the high-level language runs in the enclave and trusted code of the application are trusted, but another parts (for example, an operating system, a BIOS, and another execution environment running outside the enclave) are untrusted. The high-level language described herein may be any object-oriented high-level language, for example, the Java language or a Scala language.

The method has the following effects.

(1) The high-level language has good features such as type security and memory security. The high-level language can easily protect a trusted part of an application from a conventional memory attack, and can also prevent a memory error. This improves security of the trusted part of the application.

(2) After the developer of the application divides the application into trusted code and untrusted code, if there is no encryption/decryption logic in the trusted part of the application, the developer of the application only needs to manually add the encryption/decryption logic to the trusted part; if there is the encryption/decryption logic in the trusted part of the application, the developer of the application does not need to manually rewrite the application, so that a workload of manual rewriting code for the application can be reduced and usability of running the application in the enclave can be improved.

(3) Running a part of code of the application in the enclave may maintain a small TCB and a small attack surface of the application, and does not occupy excessive memory of the enclave during running. Therefore, execution efficiency of the application in the enclave can be improved.

To implement the foregoing method, embodiments of this application provide the following improvements.

In a first aspect, two annotation (annotation)-based programming interfaces are provided, and the two interfaces respectively are a first interface JECall and a second interface JOCall. The first interface JECall corresponds to a first annotation @JECall, and the second interface JOCall corresponds to a second annotation @JOCall. The first annotation @JECall is used to represent that a class annotated by the first annotation @JECall is an enclave entrypoint function, and the second annotation @JOCall is used to represent that a class annotated by the second annotation @JOCall is an enclave exit function. That is, the class annotated by using the first annotation is a class running in the enclave, and the class annotated by using the second annotation is a class (for example, an operating system call) that is running in the enclave in a non-enclave environment and that is invoked by the class running in the enclave. The non-enclave environment herein may also be referred to as an untrusted environment.

A developer of the application may annotate the class in the application by using the first annotation @?JECall and the second annotation @JOCall. In this way, a class annotated by JECall and a dependency class of the class annotated by JECall automatically run in the enclave, while a class annotated by JOCall exits the enclave when running in the enclave.

It should be understood that JECall, JOCall. @JECall, and (@JOCall are merely used to describe the first interface, the second interface, the first annotation, and the second annotation, specific names used by the first interface, the second interface, the first annotation, and the second annotation are not limited in this embodiment of this application.

Figure 2:
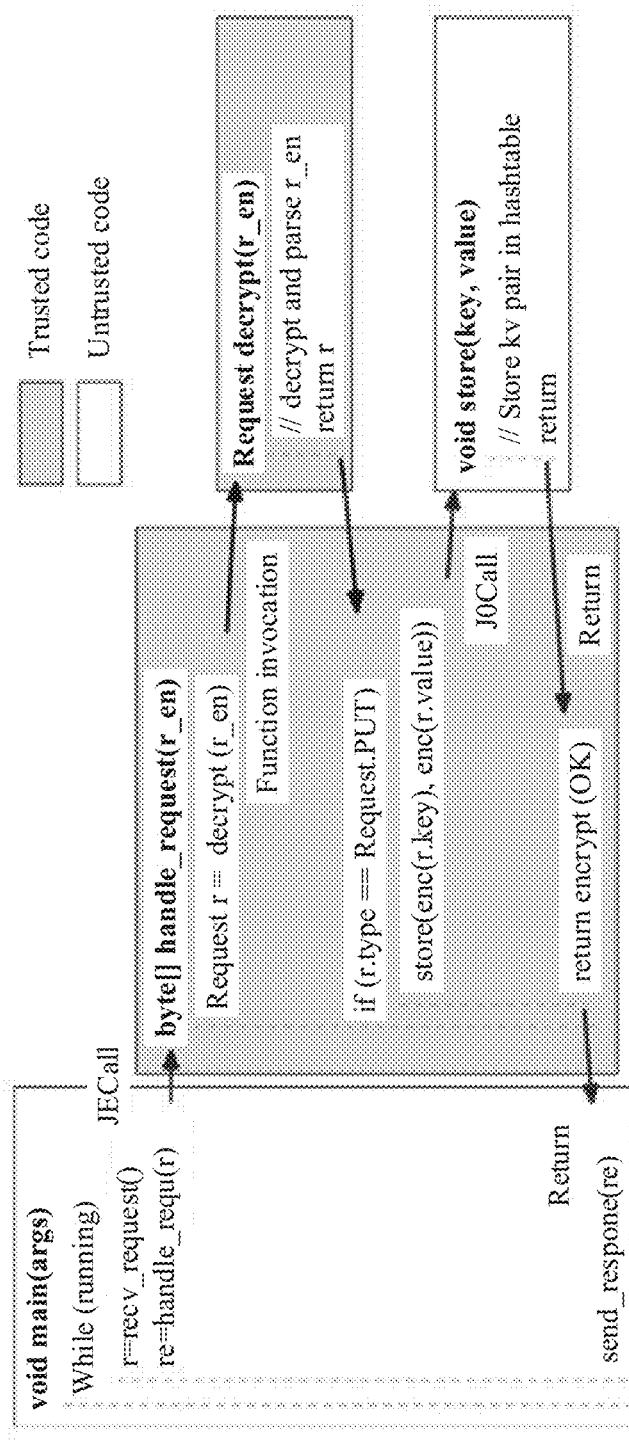
FIG. 2 is a schematic diagram of a programming model according to an embodiment of this application.

For example, FIG. 2 is a schematic diagram of a programming model according to an embodiment of this application. As shown in FIG. 2, that the programming model is applied to an application of a key-value database is used as an example. A developer of the application may divide, in the programming model, code of the application into a trusted part and an untrusted part by using the foregoing first annotation and second annotation.

For example, the application in FIG. 2 includes a handle_request function, a decrypt function, and a store function. When the handle_request function is executed, the decrypt function and the store function are invoked. If the handle_request function is annotated as JECall by the application developer and the store function is annotated as JOCall, the handle_request function and the decrypt function invoked by the handle_request function are running in the enclave. The store function invoked by the handle_request function runs in an untrusted environment. That is, when the handle_request function is invoked in the untrusted environment, it is switched to the enclave to execute the handle_request function. In a process of executing the handle_request function in the enclave, the decrypt function may be used to decrypt encrypted data provided by a client. When the store function is invoked, it is switched from the enclave to the untrusted environment to execute the function and return a result. When JECall execution completes, the JECall exits the enclave and returns an encrypted result.

Although the programming model is used as an example in FIG. 2, how to divide the code of the application into the trusted part and the untrusted part by using the foregoing first annotation and second annotation is described. It should be understood that the developer of the application may also divide the code of the application into the trusted part and the untrusted part by using the first annotation and the second annotation in another manner, and this is not limited herein.

In a second aspect, a high-level language Java language is used as an example. Code of an application written in the Java language is loaded in a dynamic class loading manner. However, using dynamic class loading in an enclave (namely, a trusted execution environment) leaks code control flow information of the enclave (namely, the trusted execution environment). For example, if a function A is executed when sensitive information is 0, and a function B is executed when the sensitive information is not 0, loading of the function A and the function B exposes the sensitive information. At the same time, dynamic loading in the enclave (namely, the trusted execution environment) prevents trusted users from knowing or verifying all code that may be executed.

Therefore, in consideration of this problem, this embodiment of this application provides a code loading manner that may ensure code integrity. In the code loading manner, code of a trusted part of an application may be loaded based on a manifest (manifest) file of the application and a dependency relationship between an enclave entrypoint function of the application and a static dependency class. In this way, only a small part of the code (that is, the enclave entrypoint function and the static dependency class) needs to be loaded when the application starts.

Figure 3:
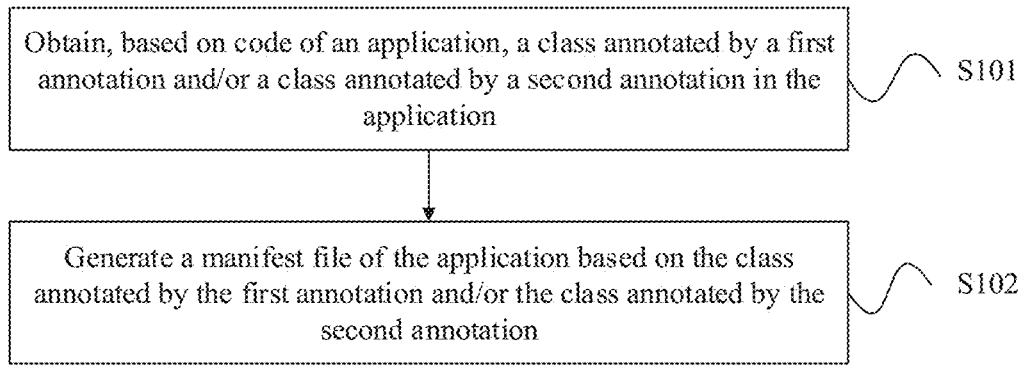
FIG. 3 is a schematic flowchart of an application processing method according to an embodiment of this application.

In a possible implementation, after a developer of the application completes annotating the application by using the first annotation and the second annotation, the following manner may be used to obtain the manifest (manifest) file of the application. FIG. 3 is a schematic flowchart of an application processing method according to an embodiment of this application. The method may be executed by any device that can obtain code of the application, for example, a device of a developer of the application, or a client that uses the application. As shown in FIG. 3, the method includes the following steps.

S101: Obtain, based on code of an application, a class annotated by a first annotation and/or a class annotated by a second annotation in the application.

For example, whether the code of the application includes the first annotation and the second annotation may be traversed, to obtain the class annotated by the first annotation and/or the class annotated by the second annotation in the application.

S102: Generate a manifest file of the application based on the class annotated by the first annotation and/or the class annotated by the second annotation.

The manifest file (manifest) of the application may include description information of the enclave entrypoint function of the application and/or description information of an enclave exit function of the application. For example, the description information herein may include, for example, a function name, a list of invoked parameters (for example, a parameter type and an execution sequence), and a return type.

Further, a static dependency class of the enclave entrypoint function of the application may be obtained based on a description file including the class annotated by the first annotation. Then, a hash value $H_0$ of the application is generated based on a hash value of the static dependency class of each enclave entrypoint function of the application and the manifest file, where the hash value $H_0$ is used to verify integrity of the static dependency class. The hash value $H_0$ herein may be, for example, a hash value obtained by using any hash algorithm, for example, an SHA256 hash value. This is not limited in this embodiment of this application.

Specifically, the description file of the class generally describes information about a static dependency class of the class. Therefore, static dependency classes of the class may be obtained based on the description file including the class annotated by the first annotation, and then static dependency classes of the static dependency classes are obtained based on description files of the static dependency classes. The rest may be deduced by analogy until all static dependency classes are obtained.

For example, an example in which a class annotated by the first annotation is a class A1 is used. It is assumed that, based on a description file of the class A1, it may be learned that static dependency classes of the class A include a class B and a class C. Based on a description file of the class B, it may be learned that static dependency classes of the class B include a class B1 and a class B2. Based on a description file of the class B2, it may be learned that static dependency classes of the class B2 include a class B21 and a class B22. Based on a description file of the class B1, it may be learned that the class B1 has no static dependency class. Based on a description file of the class C, it may be learned that the class C has no static dependency class. A specific dependency relationship may be shown in the following Table 1.

TABLE 1

| Class annotated by a first annotation | Static dependency | | |
|---|---|---|---|
| Class A1 | Class B | Class B1 | — |
|  |  | Class B2 | Class B21 |
|  |  |  | Class B22 |
|  | Class C | — | — |

In this example, the class A1 is an enclave entrypoint function of the application, and static dependency classes of the class A1 include the class B, the class B1, the class B2, the class B21, the class B22, and the class C.

It is assumed that the application has five enclave entrypoint functions in total: the class A1, a class A2, a class A3, a class A4, and a class A5. Based on a hash value of each static dependency class of the class A1, a hash value of each static dependency class of the class A2, a hash value of each static dependency class of the class A3, a hash value of each static dependency class of the class A4, and a hash value of each static dependency class of the class A5, a hash calculation is performed on the manifest file obtained in the manner of step S102, to obtain the hash value $H_0$ of the application. Subsequently, when the user remotely uses the application, integrity of the code running in the enclave may be verified by using the hash value $H_0$. For details about how to perform the verification, refer to subsequent descriptions.

Optionally, in a possible implementation, a dependency relationship between the enclave entrypoint function of the application and the static dependency class may be further obtained based on the description file including the class annotated by the first annotation. For example, the dependency relationship may be represented by using a temporary table or a dependency graph, and this is not limited herein.

Figure 4:
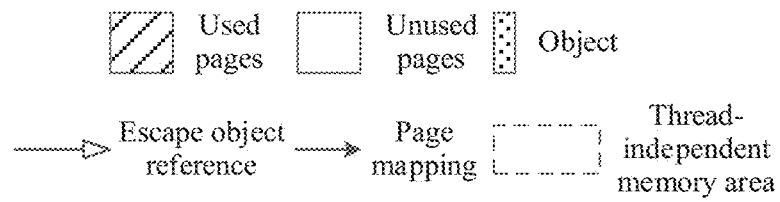
FIG. 4 is a schematic diagram of memory management according to an embodiment of this application.
Figure 4:
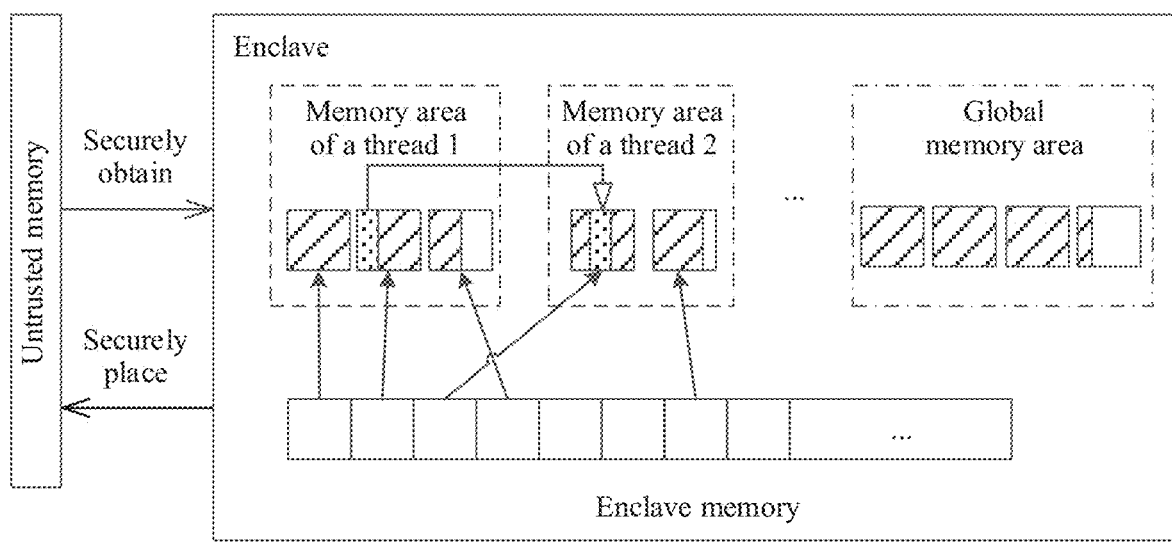

In a third aspect, a thread-independent memory management manner without participation of an operating system is provided, to avoid that a developer of an application manually manages memory. FIG. 4 is a schematic diagram of memory management according to an embodiment of this application. As shown in FIG. 4, in this embodiment of this application, a memory area is allocated in the following manner: When a thread invokes an enclave entrypoint function of the application, an independent and extensible memory area may be allocated to the thread in the enclave. In other words, memory areas of threads are independent of each other.

For example, FIG. 4 shows that when a thread 1 and a thread 2 separately invoke an enclave entrypoint function of an application, a memory area allocated to the thread 1 in the enclave memory is independent of a memory area allocated to the thread 2 in the enclave memory. In this example, the thread 1 and the thread 2 may invoke a same enclave entrypoint function or different enclave entrypoint functions.

The following describes in detail how to load code of the application with reference to specific embodiments. The following specific embodiments may be mutually combined, and same or similar concepts or processes may not be described in some embodiments.

Figure 5:
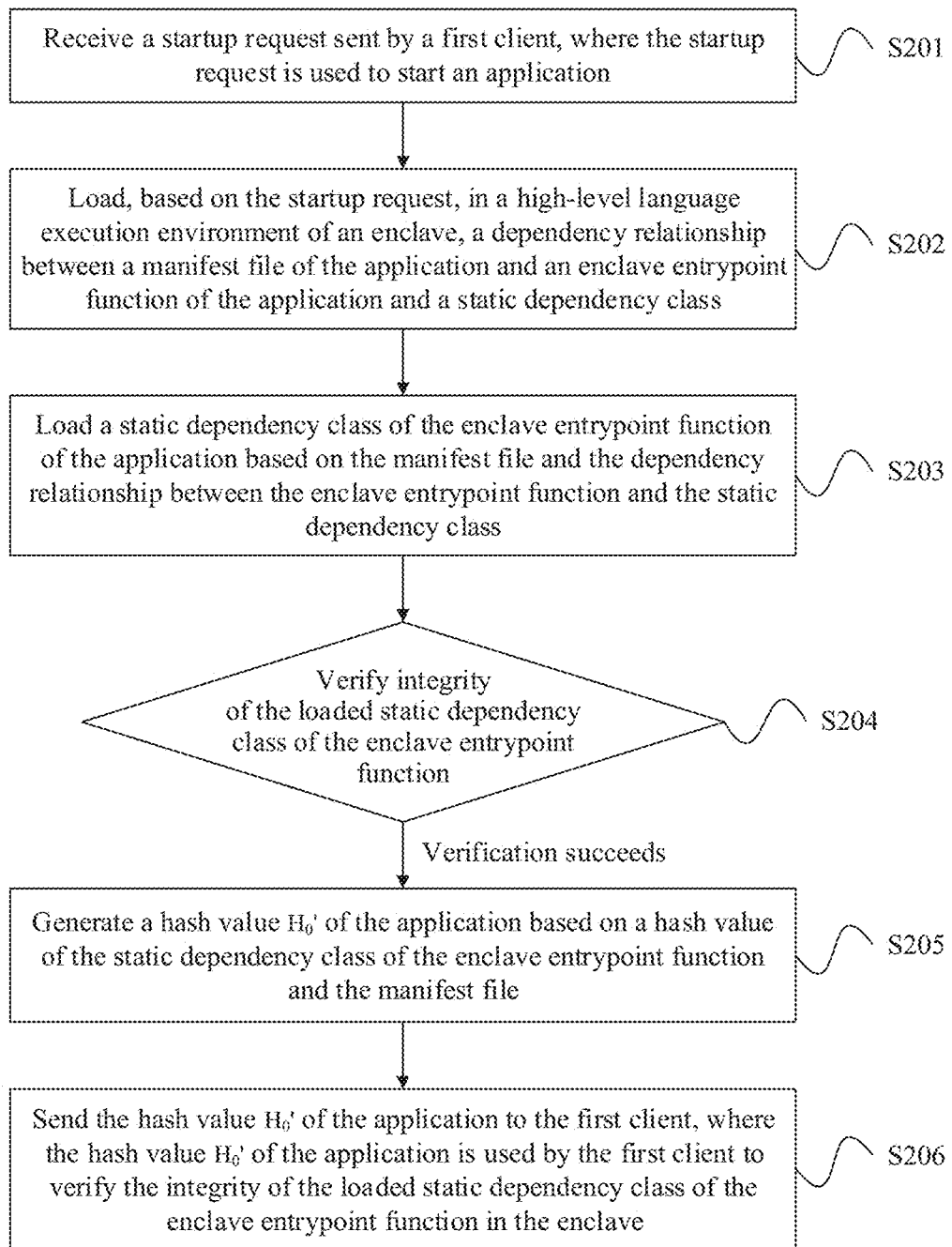
FIG. 5 is a schematic flowchart of another application processing method according to an embodiment of this application.

FIG. 5 is a schematic flowchart of another application processing method according to an embodiment of this application. The method may be executed by a computing device in a cloud environment, as shown in FIG. 5. The method includes the following steps.

S201: Receive a startup request sent by a first client, where the startup request is used to start an application.

For example, when a user needs to use the application, the user may remotely send the startup request for starting the application by using the first client.

S202: Load, based on the startup request, in a high-level language execution environment of an enclave, a manifest file of the application and a dependency relationship between an enclave entrypoint function of the application and a static dependency class.

It should be understood that the high-level language execution environment of the enclave described herein is the same as a language used for developing an application. For example, if the application is an application written by using a high-level language Java language, the high-level language execution environment of the enclave is an execution environment of the Java language.

The high-level language execution environment may have the following functions.

1. A trusted part of the application is loaded and transmitted to the enclave to generate a corresponding hash value $H'_0$, and the hash value is used by a client to verify integrity of the trusted part loaded by the client.

2. Execution of an untrusted part of the application is switched to execution of a trusted part of the application. That is, an untrusted environment is switched to a trusted environment of the enclave to execute trusted code of the application. In a switching process, description information of a function in the trusted part and a parameter that needs to be invoked are copied from an untrusted memory to a trusted enclave memory.

3. A function running in the enclave is compiled into binary code, and the binary code is run the enclave.

Optionally, the high-level language execution environment may run in the enclave in advance. Alternatively, after receiving the startup request, the computing device may load the high-level language execution environment in the enclave, and verify integrity of the high-level language execution environment. For example, a preset remote verification protocol of the trusted execution environment may be invoked to verify the integrity of the high-level language execution environment.

For example, the computing device may generate a hash value Hx of the execution environment based on the high-level language execution environment, and send the hash value of the execution environment to the first client. Correspondingly, the first client stores a hash value Hx'. If the hash value Hx' is the same as the hash value Hx, integrity verification of the high-level language execution environment loaded in the enclave succeeds. The computing device may then perform a key exchange with the first client. In this way, subsequent communication between the computing device and the first client may be encrypted by using an exchanged key.

The hash value Hx' stored by the first client may be a hash value generated by the first client by running the high-level language execution environment, or may be a trusted hash value that is obtained in another manner and that is used to verify the high-level language execution environment loaded in the enclave. This is not limited in this embodiment of this application.

The manifest file of the application loaded in the high-level language execution environment of the enclave may be a manifest file generated offline in the manner shown in FIG. 3. A manner in which the computing device obtains the manifest file is not limited in this embodiment. In an optional manner, before loading the manifest file, the computing device may receive the manifest file sent by the first client. For example, the first client may add the manifest file to the startup request and send the startup request to the computing device, the first client may send the manifest file and the startup request together to the computing device, or the first client may separately send the manifest file and the startup request to the computing device.

In another optional manner, before loading the manifest file, the computing device may obtain the stored manifest file of the application from a storage database in the cloud environment. In this case, the manifest file that is of the application and that is stored in the storage database may be pre-stored in the storage database by a maintenance engineer of the cloud environment, a developer of the application, or the like, or when a computing device in the cloud environment starts the application at one historical time, the obtained manifest file may be stored in the storage database.

The dependency relationship that is between the enclave entrypoint function of the application and the static dependency class and that is loaded in the enclave high-level language execution environment may be generated offline in the manner described above. A manner in which the computing device obtains the dependency relationship between the enclave entrypoint function of the application and the static dependency class is not limited in this embodiment. In an optional manner, before loading the dependency relationship between the enclave entrypoint function of the application and the static dependency class, the computing device may receive the dependency relationship that is between the enclave entrypoint function of the application and the static dependency class and that is sent by the first client. For how to send the dependency relationship between the enclave entrypoint function of the application and the static dependency class, refer to the foregoing description of sending the manifest file. Details are not described herein again.

In another optional manner, before loading the dependency relationship between the enclave entrypoint function of the application and the static dependency class, the computing device may obtain a stored dependency relationship between the enclave entrypoint function of the application and the static dependency class from a storage database in the cloud environment. In this case, the dependency relationship that is between the enclave entrypoint function of the application and the static dependency class and that is stored in the storage database may be pre-stored in the storage database by a maintenance engineer of the cloud environment, a developer of the application, or the like, or when a computing device in the cloud environment starts the application at one historical time, the obtained dependency relationship between the enclave entrypoint function of the application and the static dependency class may be stored in the storage database.

The dependency relationship that is between the enclave entrypoint function of the application and the static dependency class and that is loaded in the enclave high-level language execution environment may be generated online. In other words, the dependency relationship may be generated online after the computing device receives the startup request. In an optional manner, before loading the dependency relationship between the enclave entrypoint function of the application and the static dependency class, the computing device may obtain, based on code of the application, a description file including a class annotated by a first annotation in the application. Then, the computing device may obtain the dependency relationship between the enclave entrypoint function of the application and the static dependency class based on the description file including the class annotated by the first annotation in the application.

S203: Load a static dependency class of the enclave entrypoint function of the application based on the manifest file and the dependency relationship between the enclave entrypoint function and the static dependency class.

In a possible implementation, code of the application may be stored in a cloud environment, for example, a storage database of the cloud environment. After obtaining the manifest file and the dependency relationship between the enclave entrypoint function and the static dependency class, the computing device may load the static dependency class of the enclave entrypoint function of the application in the enclave based on the manifest file and the dependency 27, relationship between the enclave entrypoint function and the static dependency class.

Still refer to FIG. 5. In a possible implementation, after the static dependency class of the enclave entrypoint function of the application is loaded, the following operations may be performed.

S204: Verify integrity of the loaded static dependency class of the enclave entrypoint function.

For example, the computing device may verify, in the enclave, validity of content of the loaded static dependency class of the enclave entrypoint function and a hash value of the static dependency class, to determine the integrity of the static dependency class. When the content of the static dependency class and the hash value are both valid, it is determined that integrity verification of the static dependency class succeeds. After the integrity verification of the static dependency class of the enclave entrypoint function succeeds, step S205 may be performed. When the content of the static dependency class is invalid or the hash value is invalid, it is determined that integrity verification of the static dependency class fails. After the integrity verification of the static dependency class of the enclave entrypoint function fails, for example, a message indicating that the trusted part of the application fails to be loaded may be returned to the first client.

S205: Generate a hash value $H_0'$ of the application based on the hash value of the static dependency class of the enclave entrypoint function and the manifest file.

It should be understood that a calculation manner of the hash value $H_0'$ may be the same as the foregoing calculation manner of obtaining the hash value $H_0$. The hash value $H_0'$ may identify all code that the application loads into the enclave.

S206: Send the hash value $H_0'$ of the application to the first client, where the hash value $H_0'$ of the application is used by the first client to verify the integrity of the loaded static dependency class of the enclave entrypoint function in the enclave.

For example, the hash value $H_0$ generated offline in the foregoing manner is stored on a first client side. When receiving the hash value $H_0'$ of the application sent by the computing device, the first client may compare the hash value $H_0'$ with the hash value $H_0$. If the hash value $H_0'$ and the hash value $H_0$ are the same, integrity verification of the static dependency class of the enclave entrypoint function loaded in the enclave succeeds; or if the hash value $H_0'$ and the hash value $H_0$ are different, the integrity verification of the static dependency class of the enclave entrypoint function loaded in the enclave fails.

It should be understood that step S204 to step S206 may be performed at any moment after the static dependency class of the enclave entrypoint function of the application is loaded and before the enclave entrypoint function of the application is run. This is not limited herein.

Figure 6:
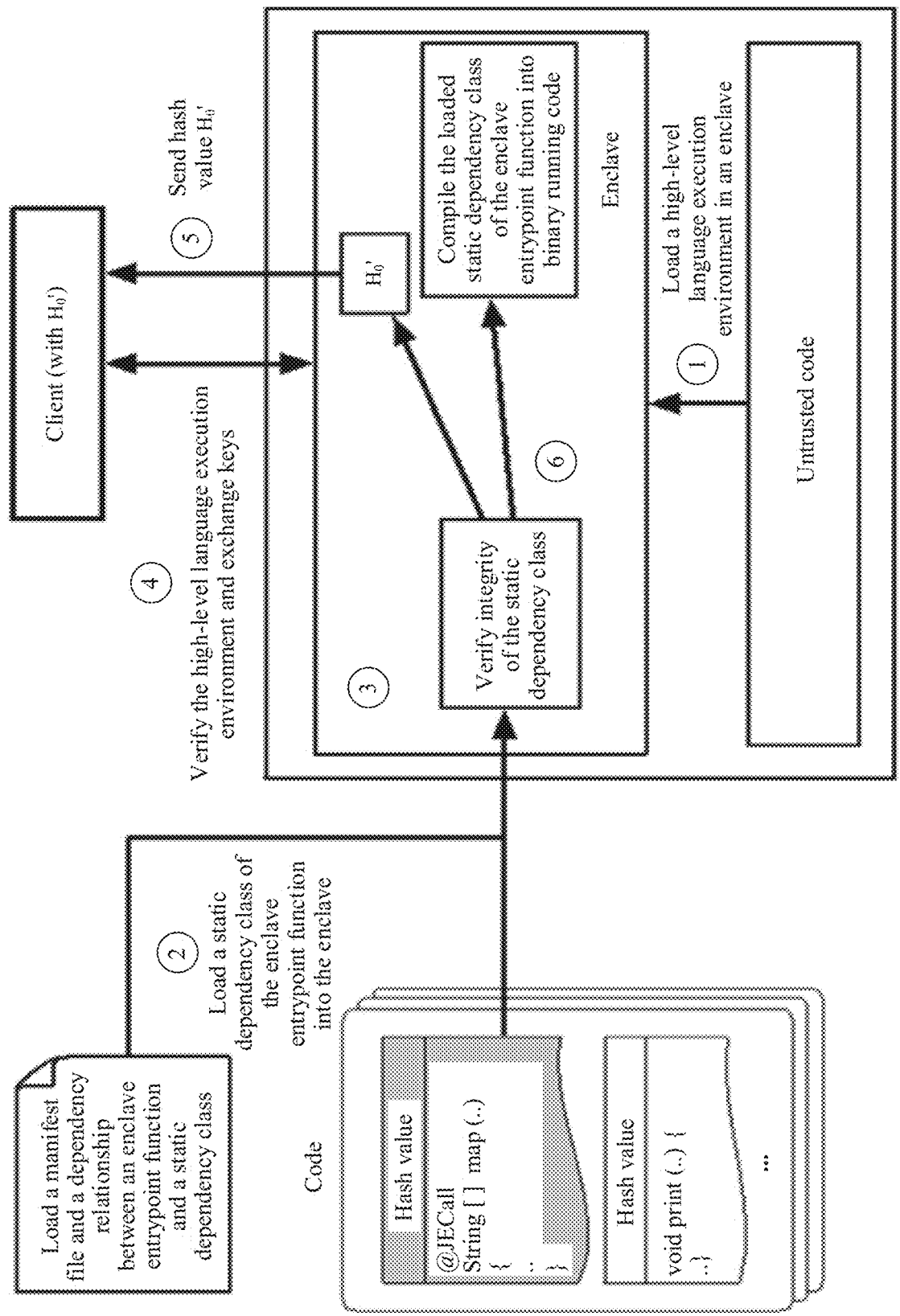
FIG. 6 is a schematic flowchart of still another application processing method according to an embodiment of this application.

The method in this embodiment is described below by using a specific example. A JVM runs on a computing device, and an application written in a Java language is deployed on an enclave of the JVM. FIG. 6 is a schematic flowchart of still another application processing method according to an embodiment of this application. As shown in FIG. 6, after receiving an application startup request sent by a client, a JVM of a computing device may perform the following steps.

1. Load a high-level language execution environment in an enclave.

2. Load a static dependency class of an enclave entrypoint function of an application to the enclave based on a loaded manifest file of the application and a dependency relationship between the enclave entrypoint function of the application and a static dependency class.

3. Verify integrity of the loaded static dependency class of the enclave entrypoint function, and after integrity verification succeeds, generate a hash value $H_0'$ of the application based on a hash value of the static dependency class of the enclave entrypoint function and the manifest file.

4. Verify, the high-level language execution environment and exchange keys with a client.

It should be understood that the action shown in step 4 may also be performed at any moment after step 1 and before step 5.

5. Send the hash value $H_0'$ of the application to the client, so that the client verifies, based on a stored hash value $H_0$ and the hash value $H_0'$, the integrity of the loaded static dependency class of the enclave entrypoint function in the enclave.

6. After the client completes integrity verification of a trusted part of the application, the loaded static dependency class of the enclave entrypoint function is compiled into binary running code, and the binary running code is run in the enclave.

According to the method in this embodiment of this application, in the high-level language execution environment running in the enclave, code of a trusted part of the application may be loaded based on the manifest (manifest) file of the application and the dependency relationship between the enclave entrypoint function of the application and the static dependency class. Therefore, a part of code (that is, the enclave entrypoint function and the static dependency class) that is of the application and that is written in a high-level language is directly run in the enclave, so that security of the trusted part of the application can be improved, the application can maintain a small TCB and a small attack surface, execution efficiency of the application can be improved in the enclave, a workload of manually rewriting code of the application can be reduced, and usability of running the application in the enclave can be improved.

The foregoing content describes how to run a part of code (namely, the enclave entrypoint function and the static dependency class) of an application written in a high-level language in the enclave. The following specifically describes a process in which the computing device invokes the enclave entrypoint function after integrity verification of the enclave entrypoint function and the static dependency class succeeds.

Figure 7:
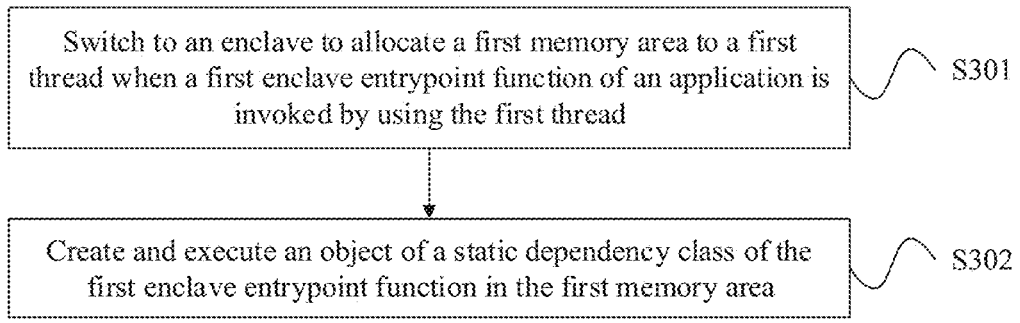
FIG. 7 is a schematic flowchart of still another application processing method according to an embodiment of this application.

FIG. 7 is a schematic flowchart of still another application processing method according to an embodiment of this application. As shown in FIG. 7, the method includes the following steps.

S301: Switch to an enclave to allocate a first memory area to a first thread when a first enclave entrypoint function of an application is invoked by using the first thread. That is, it is switched from a non-enclave environment to a high-level language execution environment of the enclave.

The foregoing first enclave entrypoint function may be any enclave entrypoint function of the application.

Optionally, the first memory area may include at least one memory page, and for example, each memory page may be 32 kilobytes (kilobyte, KB) of memory.

For example, the computing device may initially allocate a memory page to the first memory area. In a process of executing the first enclave entrypoint function invoked by the first thread, if there is a memory allocation requirement, a memory page may be added to the thread. That is, a size of the first memory area is dynamically extended. For example, an idle memory page may be found from a memory page closest to the memory area and allocated to the first thread, to ensure continuity of the first memory area. If the memory page closest to the memory area cannot meet a memory requirement of the first thread, a plurality of consecutive memory pages may be found for the first thread again in the enclave memory as the first memory area.

S302: Create and execute an object of a static dependency class of the first enclave entrypoint function in the first memory area.

After allocating the first memory area to the first thread in the foregoing manner, the computing device may create and execute the object of the static dependency class of the first enclave entrypoint function in the first memory area. For how to create an object of a class, refer to the description in the current technology, and details are not described herein again.

It should be understood that, in some embodiments, the first enclave entrypoint function may further include a static dependency class that can be executed without creating an object. For this type of static dependency class, the first enclave entrypoint function may be directly executed. Details are not described herein. In addition, in addition to the static dependency class, a dynamic dependency class and/or a first enclave exit function with an invoking relationship may also be included. The following describes how to execute the dynamic dependency class and the enclave exit function in a process of executing the first enclave entrypoint function.

Figure 8:
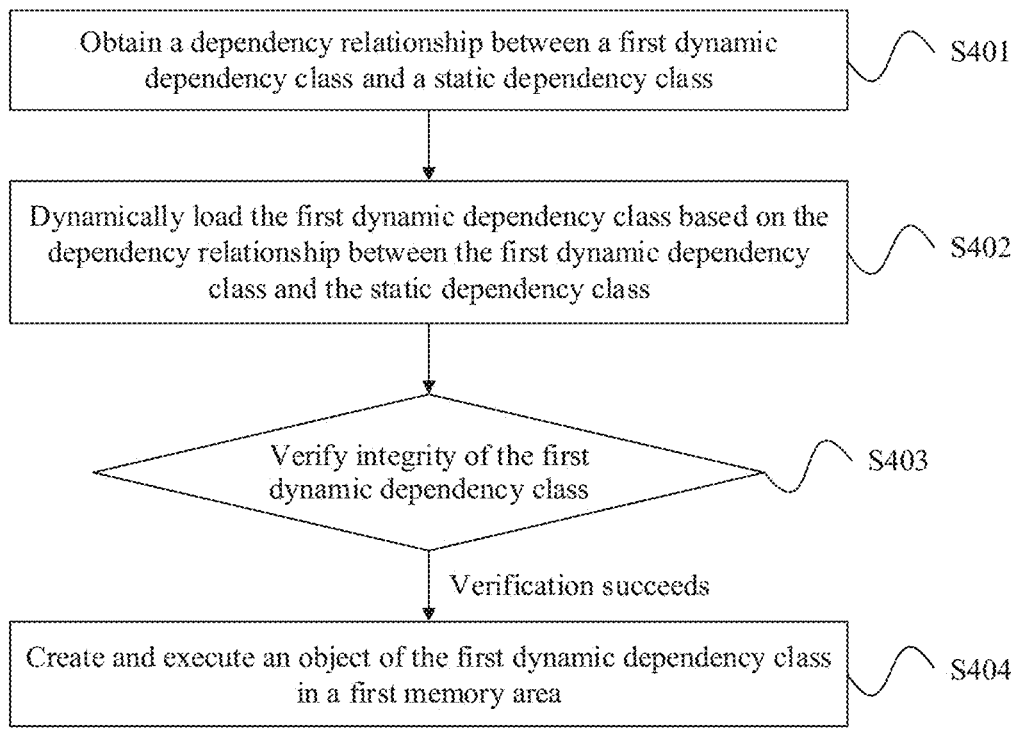
FIG. 8 is a schematic flowchart of still another application processing method according to an embodiment of this application.

For the dynamic dependency class,

FIG. 8 is a schematic flowchart of still another application processing method according to an embodiment of this application. A first dynamic dependency class is used as an example. To be specific, the first enclave entrypoint function further includes the first dynamic dependency class. As shown in FIG. 8, the computing device may perform the following operations.

S401: Obtain a dependency relationship between a first dynamic dependency class and a static dependency class.

For example, the computing device may determine, based on an operation requested to be performed when the first thread invokes the first enclave entrypoint function, a dynamic class to be executed by the first enclave entrypoint function, to obtain a dependency relationship between the dynamic dependency class and the static dependency class. It should be understood that the dependency relationship described herein includes a dependency relationship between the dynamic dependency class and all static dependency classes of the dynamic dependency class.

The Java language is used as an example. The dynamic dependency class described herein may be, for example, a class file dynamically invoked by reflection of the first enclave entrypoint function.

For how to obtain the dependency relationship between the dynamic dependency class and the static dependency class, refer to the foregoing description about obtaining the static dependency class online. Details are not described herein again.

S402: Dynamically load the first dynamic dependency class based on the dependency relationship between the first dynamic dependency class and the static dependency class.

In a possible implementation, code of the application may be stored in a cloud environment, for example, a storage database of the cloud environment. After obtaining the dependency relationship between the first dynamic dependency class and the static dependency class, the computing device may load the first dynamic dependency class in the enclave based on the dependency relationship between the first dynamic dependency class and the static dependency class.

For example, an interface for loading a dynamic dependency class may be provided, and the interface may be, for example, loadClass (classname). Classname indicates a name of a to-be-loaded dynamic dependency class. In this way, the computing device may load the classname into the enclave through the interface.

S403: Verify integrity of the first dynamic dependency class.

For example, the computing device may verify, in the enclave, validity of content of the loaded static dependency class of the first dynamic dependency class and a hash value of the static dependency class, to determine the integrity of the first dynamic dependency class. When the content of the static dependency class of the first dynamic dependency class and the hash value of the static dependency class of the first dynamic dependency class are both valid, it is determined that integrity verification of the first dynamic dependency class succeeds. After the integrity verification of the first dynamic dependency class succeeds, step S404 may be performed. When the content of the static dependency class of the first dynamic dependency class is invalid, or the hash value of the static dependency class of the first dynamic dependency class is invalid, it is determined that the integrity verification of the first dynamic dependency class fails. After the integrity verification of the first dynamic dependency class fails, for example, a message indicating that the first dynamic dependency class fails to be loaded may be returned to the first client.

Optionally, after the integrity verification of the first dynamic dependency class succeeds, a hash value He of the first dynamic dependency class may be generated based on the hash value of the static dependency class on which the first dynamic dependency class depends, and the hash value He may be sent to a client that invokes the first enclave entrypoint function by using the first thread, so that the client verifies the integrity of the first dynamic dependency class loaded in the enclave. For how to perform the verification, refer to the foregoing manner in which the client verifies the static dependency class of the enclave entrypoint function. An implementation of the verification is similar, and details are not described herein again.

S404: Create and execute an object of the first dynamic dependency class in a first memory area.

For how to create an object of a dynamic dependency class, refer to the description in the current technology, and details are not described herein again.

For an enclave exit function invoked for the first enclave entrypoint function,
the first enclave exit function invoked by the first enclave entrypoint function is used as an example. In a process of executing the first enclave entrypoint function in the enclave, the computing device may further perform the following operations.

The computing device may first switch from a high-level language execution environment of the enclave to a non-enclave environment, namely, an untrusted environment. The computing device may then execute the first enclave exit function in the non-enclave environment. Finally, the computing device returns to the enclave, to continue to execute the first enclave exit function in the high-level language execution environment in the enclave. An implementation of switching to the non-enclave environment to execute the enclave exit function is similar to a manner of switching to the non-enclave environment to execute the enclave exit function in the current technology, and details are not described herein again.

The foregoing content describes how the computing device invokes the first enclave entrypoint function of the application by using the first thread in an execution process of the application. The following explains and describes how to perform garbage collection (that is, clean the first memory area allocated to the first thread) after the first enclave entrypoint function is invoked, that is, after the first enclave entrypoint function is executed.

Figure 9:
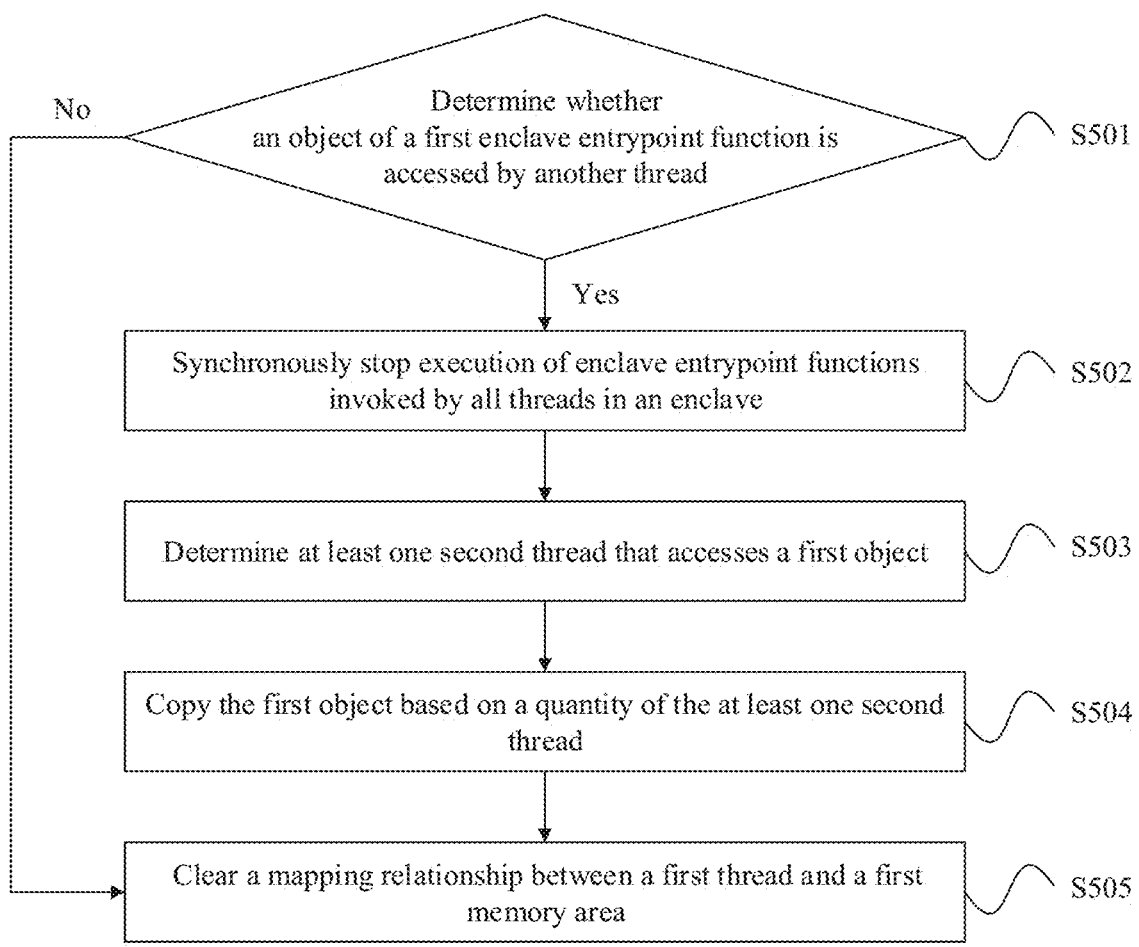
FIG. 9 is a schematic flowchart of still another application processing method according to an embodiment of this application.

FIG. 9 is a schematic flowchart of still another application processing method according to an embodiment of this application. As shown in FIG. 9, after the first enclave entrypoint function exits execution, the computing device may perform the following operations.

S501: Determine whether an object of the first enclave entrypoint function is accessed by another thread. If no object of the first enclave entrypoint function is accessed by another thread, S505 is performed; or if an object of the first enclave entrypoint function is accessed by another thread, S503 is performed.

The object described herein may be a created object of the static dependency class of the first enclave entrypoint function, or an object of a dynamic dependency class of the first enclave entrypoint function. The another thread mentioned herein refers to a thread that is in the enclave and that is invoking the enclave entrypoint function of the application. The another thread and the first thread may invoke a same enclave entrypoint function of the application, or may invoke different enclave entrypoint functions.

In this embodiment, if the object of the first enclave entrypoint function is not accessed by any thread, it indicates that the object of the first enclave entrypoint function is not shared with another thread. In this case, the first memory area is an independent memory area of the first thread, and directly clearing the first memory area does not affect the another thread. If the object of the first enclave entrypoint function is accessed by at least one another thread, it indicates that the object of the first enclave entrypoint function is shared with the another thread. In this case, the first memory area is not an independent memory area of the first thread, that is, directly clearing the first memory area affects the another thread. In some embodiments, accessing by another thread herein may also be described as accessing by an enclave entrypoint function of the application that is invoked by another thread. This is not limited in this embodiment of this application.

Still refer to FIG. 4. For example, if an object of a thread 1 is accessed by a thread 2, it indicates that the object is shared with the thread 2. In this case, the memory area of the thread 1 is not an independent memory area of the thread 1, that is, directly clearing the memory area of the thread 1 affects the thread 2.

S502: Synchronously stop execution of enclave entrypoint functions invoked by all threads in the enclave.

It should be understood that all the threads that stop execution herein are all threads (namely, the foregoing another threads) that are in the enclave and that invoke the enclave entrypoint function of the application. These threads may invoke a same enclave entrypoint function, these threads may invoke different enclave entrypoint functions, or some threads invoke a same enclave entrypoint function, and some threads invoke different enclave entrypoint functions.

S503: Determine at least one second thread that accesses a first object.

S504: Perform copying processing on the first object based on a quantity of the at least one second thread.

Still refer to FIG. 4. In this embodiment of this application, the memory area in the enclave may further include a global memory area, and the global memory area may be used to store a static variable and an object whose lifetime is longer than that of one thread.

For example, if a quantity of second threads is 1, the first object is copied to a second memory area corresponding to the second thread. If the quantity of second threads is greater than 1, the first object is copied to the enclave global memory area, so that a plurality of second threads may access the first object by accessing the global memory area, and memory space of the enclave can be saved.

After step S504 is performed, step S505 may be performed to clear the first memory area allocated to the first thread.

S505: Clear a mapping relationship between the first thread and the first memory area.

After a mapping relationship between the first thread and the first memory area is cleared, a memory page included in the first memory area may be allocated to another thread in the enclave for use, so that memory in the enclave can be released promptly, and efficiency of garbage collection can be improved.

In the foregoing manner, after the first enclave entrypoint function is executed, the first memory area allocated to the first thread may be cleared promptly, so that the memory page included in the first memory area may be allocated to another thread for use. Therefore, the enclave memory can be released promptly, and the garbage collection efficiency in the enclave memory can be improved.

In a big data computing process of a big data processing application, a plurality of threads share a small quantity of objects, and lifetimes of most enclave objects are usually in one enclave entrypoint function. Therefore, this manner may be used to improve garbage collection efficiency of the big data processing application.

In a possible implementation, this embodiment of this application proposes a multi-thread garbage collection synchronization manner in which no operating system participates. In this manner, whether a cross-area writing operation exists in different threads is recorded to capture whether an object of an enclave entry point function escapes (escape) an original memory area, that is, whether the object is accessed by another thread.

When the enclave entrypoint function has an escape object (that is, when there is an object accessed by another thread), execution of all threads needs to be stopped synchronously, the escape object is reclaimed, and another useless object (that is, an object that is not accessed by the another thread) is cleared. In this way, after the enclave entrypoint function exits execution, the memory area allocated to the thread that invokes the enclave entrypoint function is automatically cleared.

Specifically, in this embodiment of this application, to capture whether the enclave entrypoint function has an escape object, the computing device inserts a check on global variables into code of the trusted part of the application, and captures, by using the global variable, whether the enclave entrypoint function has an escape object.

For example, the computing device implements the method by using a garbage collection (garbage collect, GC) thread that reclaims the escape object by using a multi-thread synchronization mechanism. For example, the global variables involved herein may be shown in the following Table 2.

TABLE 2

| Variable name | Meaning of variables |
|---|---|
| needGC | GC is being invoked |
| nThd | Total quantity of threads executed in an enclave |
| nGCThd | Total quantity of threads stopped executing in an enclave |

In this way, when an object (assumed to be a target object) is written into a member variable of another object, the computing device may check a memory area to which the target object belongs. It is assumed that an identifier (for example, an ID or an index of the memory area) of the memory area to which the target object belongs is different from an identifier of the memory area into which the target object is written, the memory area including the target object and a record of the memory area into which the target object is written are written into an escape object list of the thread to which the target object belongs, and an escape object list of the thread corresponding to the memory area of the target object.

When the thread to which the target object belongs exits, the computing device may determine, based on the escape object list, whether an escape object exists. When no escape object exists, that is, the list is empty, a mapping relationship between the thread and the allocated memory area is cleared. When an escape object exists, that is, the list is not empty, the multi-thread synchronization mechanism is invoked to reclaim (that is, GC thread) the escape object.

Specifically, first, execution of all threads is stopped synchronously to prevent another thread from accessing these escape objects at the same time. After all threads are stopped, execution stacks and escape object lists of all threads are scanned to find all objects that belong to a memory area of a current thread. For each escape object, if the escape object escapes to a memory area of another thread, the escape object is copied to the memory area of the another thread. If the escape object escapes to memory areas of a plurality of threads, the escape object is copied to a global memory area of the enclave.

For example, the global variables shown in Table 2 are used as an example. It is assumed that when invoking the GC to perform multi-thread synchronization for the first thread, the computing device may first attempt to set the global variable needGC from 0 to 1.

1. If the needGC is set successfully, it indicates that the multi-thread synchronization is successfully invoked. Then, the computing device performs an atomic operation on the global variable nGCThd. Correspondingly, the nhd performs the atomic operation when the first thread starts to execute the first enclave function. When the variable nGCThd is equal to the nThd, it indicates that all threads in the enclave have stopped executing, and the escape object may be reclaimed. After reclaiming of the escape object is completed, the nGCThd and the nThd are decreased, the needGC is set to 0, and it indicates that another thread except the first thread may resume execution.

2. If a value of the needGC fails to be set, it indicates that another thread invokes the multi-thread synchronization mechanism. In this case, the value of nGCThd is increased. After the value of needGC changes to 0, the value of nGCThd is decreased, and the step of setting the global variable needGC from 0 to 1 is returned to be executed.

For a thread running in the enclave, the computing device inserts a needGC check (non-atomic) into a loop check and a function entrypoint in trusted code of the generated application. When the value of needGC is 1, the thread stops executing until the value of needGC changes to 0. In addition, the thread increases a value of nGChd to notify the GC that the thread has stopped executing. When the value of needGC is 0, the thread resumes execution.

In the foregoing manner, after the first enclave entrypoint function is executed, the first memory area allocated to the first thread may be cleared promptly, so that the memory page included in the first memory area may be allocated to another thread for use. Therefore, the enclave memory can be released promptly, and the garbage collection efficiency in the enclave memory can be improved.

In addition, because the foregoing garbage collection manner does not require participation of an operating system, that is, dependency between a garbage collection operation and invoking of the operating system is removed. Therefore, there is no need to interact with the operating system when garbage collection is performed, so that a side-channel (side-channel) attack in a privilege attack and an iago (iago) attack can be avoided during the garbage collection.

It should be understood that the side channel attack described herein is an attack manner in which an attacker guesses, by observing a side-channel (for example, execution time or an enclave exit function), privacy data of an application running in the enclave. For example, when one piece of sensitive data is 1, two enclave exit functions are executed, and when the sensitive data is 0, one enclave exit function is executed. Attackers may guess a value of the sensitive data by observing execution time of the enclave exit function.

The iago attack herein refers to an attack manner in which an attacker manipulates an untrusted operating system to provide input for an application running in the enclave, so that a control flow of the application running in the enclave changes. For example, it is assumed that an application running in the enclave relies on a file input that contains an integer. When the integer is 1, the application running in the enclave executes a do_one function. When the integer is 0, the application running in the enclave executes a do_zero function. Therefore, integrity of the enclave program is damaged when an attacker manipulates an untrusted operating system to change the input provided to the application running in the enclave.

The following briefly describes, by using a specific example, a process of memory management and garbage collection in a process in which the first thread invokes the first enclave entrypoint function.

Figure 10:
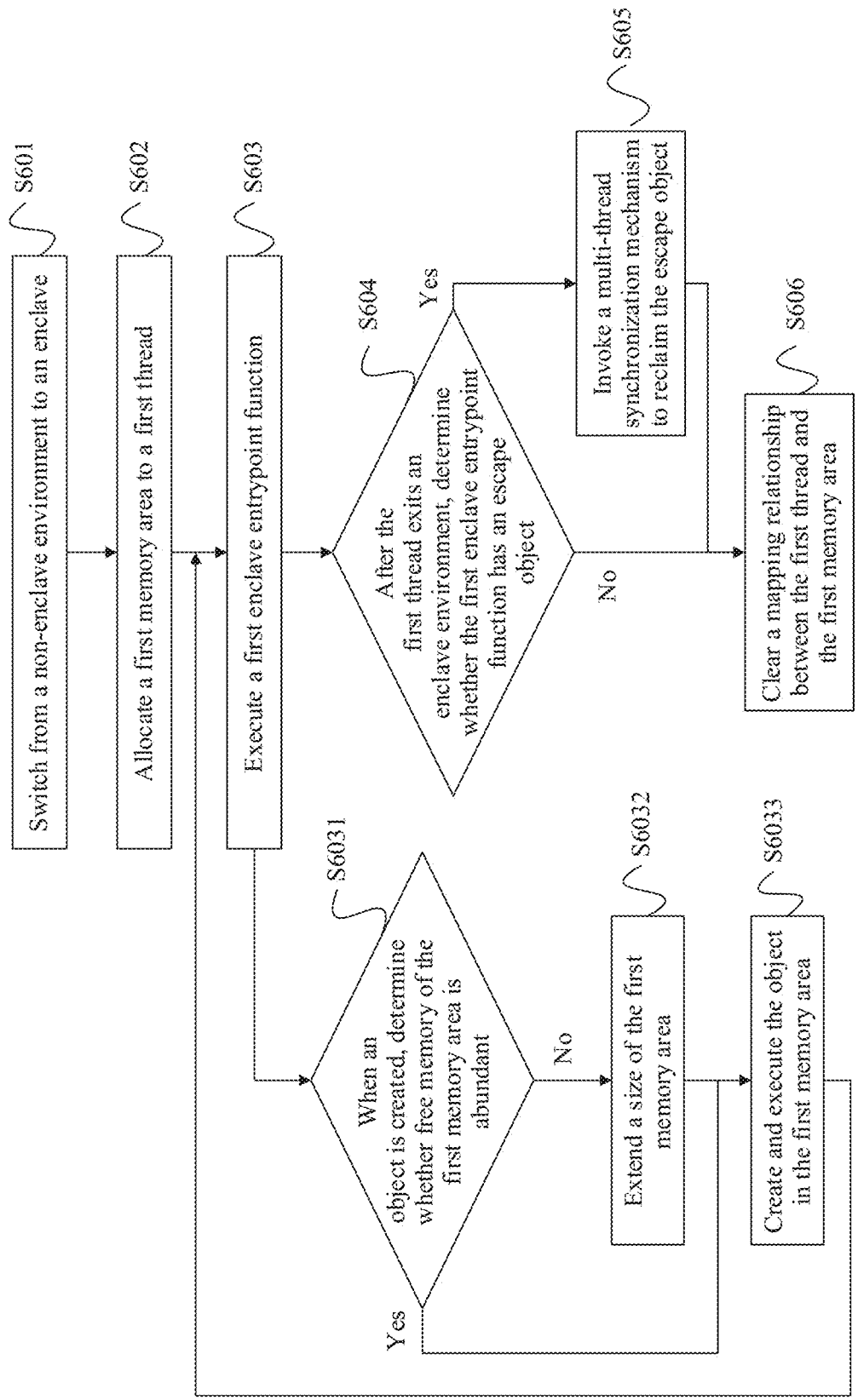
FIG. 10 is a schematic flowchart of still another application processing method according to an embodiment of this application.

FIG. 10 is a schematic flowchart of still another application processing method according to an embodiment of this application. As shown in FIG. 10, the method includes the following steps.

S601: Switch from a non-enclave environment to an enclave.

S602: Allocate a first memory area to a first thread.

For example, the computing device may initially allocate a memory page to the first memory area. For example, the memory page may be 32 KB of memory.

S603: Execute a first enclave entrypoint function.

The following operations are performed in a process of executing the first enclave entrypoint function.

S6031: When an object is created, determine whether free memory of the first memory area is abundant. If the free memory of the first memory area is not abundant, S6032 is performed; or if the free memory of the first memory area is abundant, S6033 is performed.

The object mentioned herein may be an object of a static dependency class or an object of a dynamic dependency class.

S6032: Extend a size of the first memory area.

S6033: Create and execute the object in the first memory area, and return to continue executing the first enclave entrypoint function.

S604: After the first thread exits an enclave environment, determine whether the first enclave entrypoint function has an escape object. If the first enclave entrypoint function has an escape object, S605 is performed; or if the first enclave entrypoint function has no escape object, S606 is performed.

That is, this step is performed after the first enclave entrypoint function is executed.

S605: Invoke a multi-thread synchronization mechanism to reclaim the escape object.

S606: Clear a mapping relationship between the first thread and the first memory area.

In this way, memory management and garbage collection that are in a process in which the first thread invokes the first enclave entrypoint function are completed.

It should be understood that FIG. 10 is merely intended to describe process logic of memory management and garbage collection, and omits content irrelevant to memory management in an actual execution process, for example, content of invoking an enclave exit function in an execution process of the first enclave entrypoint function. For details, refer to the detailed description of each part in the foregoing embodiments. Details are not described herein again.

It should be noted that, although the trusted execution environment enclave is used as an example in this embodiment of this application, how to run an application written in a high-level language in the trusted execution environment is described. However, a person skilled in the art may understand that the method in this embodiment of this application may also be applied to another trusted execution environment. This is not limited herein.

Figure 11:
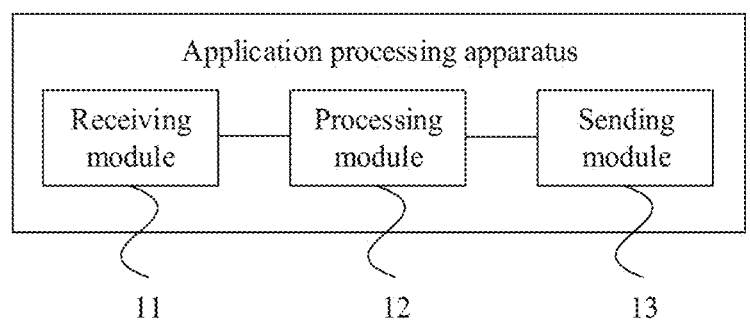
FIG. 11 is a schematic diagram of a structure of an application processing apparatus according to an embodiment of this application.

FIG. 11 is a schematic diagram of a structure of an application processing apparatus according to an embodiment of this application. As shown in FIG. 11, the application processing apparatus may be the foregoing computing device, or may be a chip of the computing device. The application processing apparatus includes a receiving module 11 and a processing module 12. Optionally, in some embodiments, the application processing apparatus may further include a sending module 13.

The receiving module 11 is configured to receive a startup request sent by a first client, where the startup request is used to start an application.

The processing module 12 is configured to: load, based on the startup request, in a high-level language execution environment of an enclave, a manifest file of the application and a dependency relationship between an enclave entrypoint function of the application and a static dependency class; and load a static dependency class of the enclave entrypoint function of the application based on the manifest file and the dependency relationship between the enclave entrypoint function and the static dependency class. The manifest file includes description information of the enclave entrypoint function of the application and/or description information of an enclave exit function of the application.

In a possible implementation, the processing module 12 is further configured to: before the dependency relationship between the enclave entrypoint function of the application and the static dependency class is loaded, based on code of the application, obtain a description file including a class annotated by a first annotation in the application; and obtain the dependency relationship between the enclave entrypoint function of the application and the static dependency class based on the description file including the class annotated by the first annotation in the application, where the first annotation is used to represent that the class annotated by the first annotation is an enclave entrypoint function.

In a possible implementation, the processing module 12 is further configured to: before the dependency relationship between the enclave entrypoint function of the application and the static dependency class is loaded, receive, by using the receiving module 11, the dependency relationship that is between the enclave entrypoint function of the application and the static dependency class and that is sent by the first client. Alternatively, the processing module 12 is further configured to: before the dependency relationship between the enclave entrypoint function of the application and the static dependency class is loaded, obtain the dependency relationship between the enclave entrypoint function of the application and the static dependency class from a storage database.

In a possible implementation, the processing module 12 is further configured to: before the manifest file of the application is loaded, receive the manifest file of the application by using the receiving module 11, where the manifest file is sent by the first client. Alternatively, the processing module 12 is further configured to: before the manifest file of the application is loaded, obtain the manifest file of the application from the storage database.

In a possible implementation, the processing module 12 is further configured to: before the manifest file of the application and the dependency relationship between the enclave entrypoint function of the application and the static dependency class are loaded, load a high-level language execution environment in the enclave, to verify integrity of the high-level language execution environment.

In a possible implementation, the processing module 12 is further configured to: after the static dependency class of the enclave entrypoint function of the application is loaded, verify integrity of the loaded static dependency class of the enclave entrypoint function; and after integrity verification of the static dependency class of the enclave entrypoint function succeeds, generate a hash value of the application based on a hash value of the static dependency class of the enclave entrypoint function and the manifest file. The sending module 13 is configured to send the hash value of the application to the first client, where the hash value of the application is used by the first client to verify the integrity of the loaded static dependency class of the enclave entrypoint function in the enclave.

In a possible implementation, the processing module 12 is further configured to: after the integrity verification of the static dependency class of the enclave entrypoint function succeeds, when a first enclave entrypoint function of the application is invoked by using a first thread, switch to a first memory area allocated to the first thread in the enclave; and create and execute an object of a static dependency class of the first enclave entrypoint function in the first memory area.

In a possible implementation, the first enclave entrypoint function further includes a first dynamic dependency class. The processing module 12 is further configured to: obtain a dependency relationship between the first dynamic dependency class and the static dependency class; dynamically load the first dynamic dependency class based on the dependency relationship between the first dynamic dependency class and the static dependency class; verify integrity of the first dynamic dependency class; and after integrity verification of the first dynamic dependency class succeeds, create and execute an object of the first dynamic dependency class in the first memory area.

In a possible implementation, the first enclave entrypoint function and the first enclave exit function have an invoking relationship. The processing module 12 is further configured to: switch from the high-level language execution environment of the enclave to a non-enclave environment; execute the first enclave exit function in the non-enclave environment; and return to the high-level language execution environment of the enclave.

In a possible implementation, the processing module 12 is further configured to: after the first enclave entrypoint function exits execution, if no object of the first enclave entrypoint function is accessed by another thread, clear a mapping relationship between the first thread and the first memory area.

In a possible implementation, the processing module 12 is further configured to: after the first enclave entrypoint function exits execution, if a first object of the first enclave entrypoint function is accessed by another thread, synchronously stop execution of enclave entrypoint functions invoked by all threads in the enclave; determine at least one second thread that accesses the first object; perform copy processing on the first object based on a quantity of the at least one second thread; and clear the mapping relationship between the first thread and the first memory area. For example, the processing module 12 is specifically configured to: when a quantity of second threads is 1, copy the first object to a second memory area corresponding to the second thread; or when a quantity of second threads is greater than 1, copy the first object to a global memory area of the enclave.

It should be understood that the receiving module 11 and the sending module 13 may be integrated into a transceiver module, or the receiving module 11 and the sending module 13 may be separated.

The application processing apparatus provided in this embodiment of this application may perform actions of the computing device shown in FIG. 5 to FIG. 10 in the foregoing method embodiment. Implementation principles and technical effects thereof are similar, and details are not described herein again.

Optionally, the foregoing application processing apparatus may further include at least one storage module. The storage module may include data and/or instructions. The processing module and/or the transceiver module (or a receiving module and a sending module) may read the data and/or the instructions in the storage module, to implement a corresponding method.

An embodiment of this application further provides a schematic diagram of a structure of an application processing apparatus. The application processing apparatus may be the foregoing device that can obtain code of an application, or may be a chip of the device. The application processing apparatus includes a processing module 21.

The processing module 21 is configured to obtain, based on code of an application, a class annotated by a first annotation and/or a class annotated by a second annotation in the application; and generate a manifest file of the application based on the class annotated by the first annotation and/or the class annotated by the second annotation, where the first annotation is used to represent that the class annotated by the first annotation is an enclave entrypoint function, the second annotation is used to represent that the class annotated by the second annotation is an enclave exit function, and the manifest file includes: description information of an enclave entrypoint function of the application and/or description information of an enclave exit function of the application.

In a possible implementation, the processing module 21 is further configured to: obtain a static dependency class of the enclave entrypoint function of the application based on a description file including the class annotated by the first annotation; generate a hash value of the application based on a hash value of the static dependency class of the enclave entrypoint function and the manifest file, where the hash value of the application is used to verify integrity of the static dependency class.

In a possible implementation, the processing module 21 is further configured to obtain the dependency relationship between the enclave entrypoint function of the application and the static dependency class based on the description file including the class annotated by the first annotation.

In a possible implementation, the application processing apparatus may further include a transceiver module (or a receiving module and a sending module), and the processing module may communicate with another peripheral by using the transceiver module (or the receiving module and the sending module). This is not limited in this embodiment of this application.

The application processing apparatus provided in this embodiment of this application may perform actions of the device that can obtain code of an application and that is shown in FIG. 3 in the foregoing method embodiment. Implementation principles and technical effects thereof are similar, and details are not described herein again.

Optionally, the foregoing application processing apparatus may further include at least one storage module. The storage module may include data and/or instructions. The processing module 21 may read the data and/or the instructions in the storage module, to implement a corresponding method.

It should be noted that, it should be understood that the receiving module may be a receiver or a communications interface during actual implementation, and the sending module may be a transmitter or a communications interface during actual implementation. The processing module may be implemented in a form of software invoked by a processing element, or in a form of hardware. For example, the processing module may be a separately disposed processing element, or may be integrated into a chip of the foregoing apparatus for implementation. In addition, the processing module may be stored in a memory of the foregoing apparatus in a form of program code, and may be invoked by a processing element of the foregoing apparatus to perform a function of the foregoing processing module. In addition, all or some of the modules may be integrated together, or may be implemented independently. The processing element herein may be an integrated circuit and has a signal processing capability. In an implementation process, the steps of the foregoing method or the foregoing modules may be completed by using an integrated logic circuit of hardware in a processor element, or by using instructions in a form of software.

To be specific, the foregoing modules may be configured as one or more integrated circuits for performing the foregoing methods, for example, one or more application specific integrated circuits (application specific integrated circuit, ASIC), one or more microprocessors (digital signal processor, DSP), or one or more field programmable gate arrays (field programmable gate array. FPGA). For another example, when one of the foregoing modules is implemented by scheduling program code by a processing element, the processing element may be a general-purpose processor, for example, a central processing unit (central processing unit, CPU) or another processor that may invoke the program code. For another example, these modules may be integrated together, and implemented in a form of a system-on-a-chip (system-on-a-chip. SOC).

Figure 12:
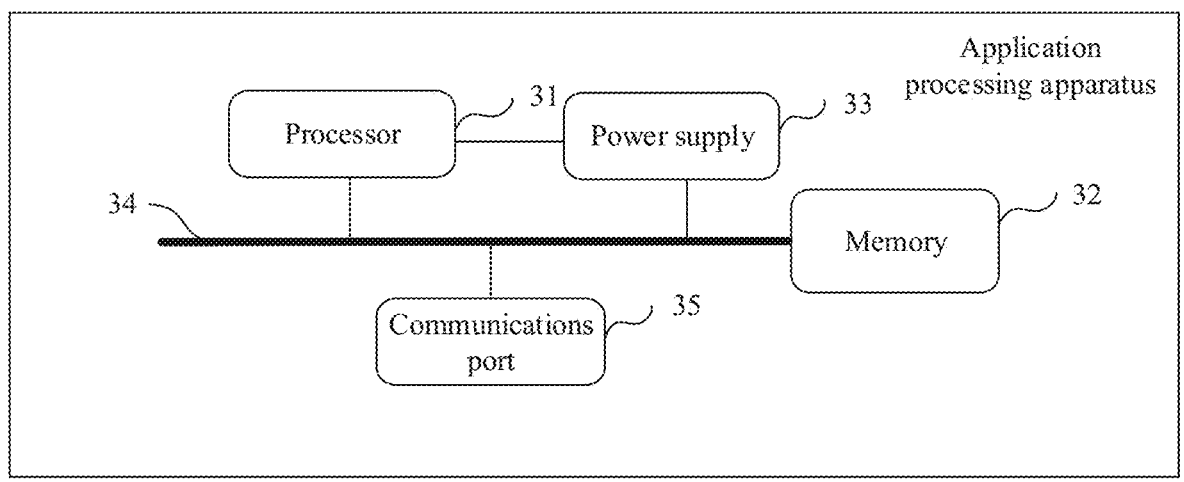
FIG. 12 is a schematic diagram of a structure of another application processing apparatus according to an embodiment of this application.

FIG. 12 is a schematic diagram of a structure of another application processing apparatus according to an embodiment of this application. As shown in FIG. 12, the application processing apparatus may include a processor 31 (for example, a CPU) and a memory 32. The memory 32 may include a high-speed random-access memory (random-access memory, RAM), or may further include a non-volatile memory (non-volatile memory, NVM), such as, at least one magnetic disk memory. The memory 32 may store various instructions, to complete various processing functions and implement method steps in this application. Optionally, the application processing apparatus in this application may further include a power supply 33, a communications bus 34, and a communications port 35. The communications bus 34 is configured to implement communication and connection between elements. The communications port 35 is configured to implement connection and communication between the application processing apparatus and another peripheral.

In this embodiment of this application, the memory 32 is configured to store computer-executable program code, and the program code includes instructions. When the processor 31 executes the instructions, the instructions enable the application processing apparatus to perform an action of the computing device in the foregoing method embodiments. Alternatively, when the processor 31 executes the instructions, the instructions enable the application processing apparatus to execute an action of the device that can obtain code of the application in the foregoing method embodiment. Implementation principles and technical effects thereof are similar, and details are not described herein again.

An embodiment of this application further provides a computer-readable storage medium. The computer-readable storage medium stores computer instructions used to implement the method performed by the computing device in the foregoing method embodiment or the method performed by the device that can obtain code of an application.

For example, when the computer instructions are executed, the application processing apparatus may implement the method executed by the computing device in the foregoing method embodiment or the method executed by the device that can obtain code of an application.

An embodiment of this application further provides a computer program product including instructions. When the instructions are executed, the computer is enabled to implement the method performed by the computing device in the foregoing method embodiment or the method performed by the device that can obtain code of an application.

An embodiment of this application further provides a cloud environment, and the cloud environment includes the computing device and the client described above in the foregoing embodiment.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or the functions according to embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Drive (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects. In the formula, the character "/" indicates a "division" relationship between the associated objects.

It may be understood that various numeral numbers in embodiments of this application are merely used for differentiation for ease of description, and are not used to limit the scope of embodiments of this application.

It may be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

What is claimed is:

1. An application processing method, wherein the method comprises:
   receiving, from a first client device, a startup request for starting an application;
   loading, in a high-level language execution environment of an enclave and based on the startup request, a manifest file of the application and a dependency relationship between an enclave entrypoint function of the application and a static dependency class, wherein the manifest file comprises description information of the enclave entrypoint function of the application or description information of an enclave exit function of the application; and
   loading a static dependency class of the enclave entrypoint function of the application based on the manifest file and the dependency relationship between the enclave entrypoint function and the static dependency class.

2. The method according to claim 1, wherein before loading the dependency relationship, the method further comprises:
   obtaining, based on code of the application, a description file comprising a class annotated by a first annotation in the application, wherein the first annotation indicates that the class annotated by the first annotation is an enclave entrypoint function; and
   obtaining the dependency relationship between the enclave entrypoint function of the application and the static dependency class based on the description file.

3. The method according to claim 1, wherein before loading the dependency relationship, the method further comprises:
   receiving the dependency relationship from the first client device or obtaining the dependency relationship from a storage database.

4. The method according to claim 1, wherein before loading the manifest file, the method further comprises:
   receiving the manifest file from the first client device or obtaining the manifest file from a storage database.

5. The method according to claim 1, wherein before loading the manifest file and the dependency relationship, the method further comprises:
   loading the high-level language execution environment in the enclave; and
   verifying integrity of the high-level language execution environment.

6. The method according to claim 1, wherein after loading the static dependency class of the enclave entrypoint function of the application, the method further comprises:
   verifying integrity of the loaded static dependency class of the enclave entrypoint function;
   after integrity verification of the static dependency class of the enclave entrypoint function succeeds, generating a hash value of the application based on a hash value of the static dependency class of the enclave entrypoint function and the manifest file; and
   sending the hash value of the application to the first client device for the first client device to verify the integrity of the loaded static dependency class of the enclave entrypoint function in the enclave.

7. The method according to claim 6, wherein a first enclave entrypoint function of the application is invoked by using a first thread, and wherein the method further comprises:

after the integrity verification of the static dependency class of the enclave entrypoint function succeeds, switching to a first memory area allocated to the first thread in the enclave; and generating and executing an object of a static dependency class of the first enclave entrypoint function in the first memory area.

8. The method of claim 7, wherein the first enclave entrypoint function further comprises a first dynamic dependency class, and wherein the method further comprises:

obtaining a dependency relationship between the first dynamic dependency class and the static dependency class;

dynamically loading the first dynamic dependency class based on the dependency relationship;

verifying integrity of the first dynamic dependency class; and generating and executing an object of the first dynamic dependency class in the first memory area after integrity verification of the first dynamic dependency class succeeds.

9. The method according to claim 7, wherein the first enclave entrypoint function and a first enclave exit function have an invoking relationship, and the method further comprises:

switching from the high-level language execution environment of the enclave to a non-enclave environment;

executing the first enclave exit function in the non-enclave environment; and returning to the high-level language execution environment of the enclave.

10. The method according to claim 7, wherein no object of the first enclave entrypoint function is accessed by another thread, and wherein the method further comprises:

after the first enclave entrypoint function exits execution, clearing a mapping relationship between the first thread and the first memory area.

11. The method according to claim 7, wherein a first object of the first enclave entrypoint function is accessed by another thread, and wherein the method further comprises:

after the first enclave entrypoint function exits execution, synchronously stopping execution of enclave entrypoint functions invoked by all threads in the enclave;

determining at least one second thread that accesses the first object;

performing copying on the first object based on a quantity of the at least one second thread; and clearing a mapping relationship between the first thread and the first memory area.

12. The method according to claim 11, wherein performing copying on the first object comprises:

if a quantity of second threads is 1, copying the first object to a second memory area corresponding to the second thread; or if a quantity of second threads is greater than 1, copying the first object to a global memory area of the enclave.

13. An application processing apparatus, wherein the apparatus comprises:

at least one processor; and one or more memories coupled to the at least one processor and storing programming instructions for execution by the at least one processor to:

receive, from a first client device, a startup request for starting an application; and load, in a high-level language execution environment in an enclave and based on the startup request, a manifest file of the application and a dependency relationship between an enclave entrypoint function of the application and a static dependency class, and load a static dependency class of the enclave entrypoint function of the application based on the manifest file and the dependency relationship between the enclave entrypoint function and the static dependency class, wherein the manifest file comprises: description information of the enclave entrypoint function of the application or description information of an enclave exit function of the application.

14. The apparatus according to claim 13, wherein the programming instructions are for execution by the at least one processor:

before the dependency relationship is loaded, obtain, based on code of the application, a description file comprising a class annotated by a first annotation in the application; and obtain the dependency relationship between the enclave entrypoint function of the application and the static dependency class based on the description file, wherein the first annotation indicates that the class annotated by the first annotation is an enclave entrypoint function.

15. The apparatus according to claim 13, wherein the programming instructions are for execution by the at least one processor to:

before the dependency relationship is loaded, receive the dependency relationship from the first client device or before the dependency relationship obtain the dependency relationship from a storage database.

16. The apparatus according to claim 13, wherein the programming instructions are for execution by the at least one processor to:

before loading the manifest file of the application, receive the manifest file sent by the first client device or obtain the manifest file from a storage database.

17. The apparatus according to claim 13, wherein the programming instructions are for execution by the at least one processor to:

load a high-level language execution environment in the enclave before loading the manifest file of the application and the dependency relationship between the enclave entrypoint function of the application and the static dependency class; and verify integrity of the high-level language execution environment.

18. The apparatus according to claim 13, wherein the programming instructions are for execution by the at least one processor to:

after the static dependency class of the enclave entrypoint function of the application is loaded, verify integrity of the loaded static dependency class of the enclave entrypoint function;

after integrity verification of the static dependency class of the enclave entrypoint function succeeds, generate a hash value of the application based on a hash value of the static dependency class of the enclave entrypoint function and the manifest file; and send the hash value of the application to the first client device for the first client device to verify integrity of the loaded static dependency class of the enclave entrypoint function in the enclave.

19. The apparatus according to claim 18, wherein a first enclave entrypoint function of the application is invoked by using a first thread, wherein the programming instructions are for execution by the at least one processor to:

after integrity verification of the static dependency class of the enclave entrypoint function succeeds, switch to a first memory area allocated to the first thread in the enclave; and generate and execute an object of a static dependency class of the first enclave entrypoint function in the first memory area.

20. The apparatus of claim 19, wherein the first enclave entrypoint function further comprises a first dynamic dependency class;

the processor is further configured to:

obtain a dependency relationship between the first dynamic dependency class and the static dependency class; dynamically load the first dynamic dependency class based on the dependency relationship; verify integrity of the first dynamic dependency class; and after integrity verification of the first dynamic dependency class succeeds, generate and execute an object of the first dynamic dependency class in the first memory area.

\* \* \* \* \*

UNITED STATES PATENT AND TRADEMARK OFFICE
CERTIFICATE OF CORRECTION

Page 1 of 1

PATENT NO. : 12,153,716 B2
APPLICATION NO. : 17/975163
DATED : November 26, 2024
INVENTOR(S) : Jianyu Jiang et al.

It is certified that error appears in the above-identified patent and that said Letters Patent is hereby corrected as shown below:

In the Claims

In Column 36, In Line 14 (Approx.), In Claim 14, delete "processor:" and insert -- processor to: --.

Signed and Sealed this
Fourth Day of March, 2025

Coke Morgan Stewart
*Acting Director of the United States Patent and Trademark Office*